US012676981B2

(12) United States Patent
Chen et al.

(10) Patent No.: US 12,676,981 B2
(45) Date of Patent: Jul. 7, 2026

(54) IMAGE DECODING METHOD AND APPARATUS, IMAGE CODING METHOD AND APPARATUS, DEVICE AND STORAGE MEDIUM

(71) Applicant: HANGZHOU HIKVISION DIGITAL TECHNOLOGY CO., LTD., Hangzhou (CN)

(72) Inventors: Fangdong Chen, Hangzhou (CN); Xiaoyang Wu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/147,626

(22) PCT Filed: Jan. 12, 2024

(86) PCT No.: PCT/CN2024/071970
§ 371 (c)(1),
(2) Date: Jul. 11, 2025

(87) PCT Pub. No.: WO2024/149367
PCT Pub. Date: Jul. 18, 2024

(65) Prior Publication Data
US 2026/0122241 A1 Apr. 30, 2026

(30) Foreign Application Priority Data

Jan. 13, 2023 (CN) ......................... 202310055970.0

(51) Int. Cl.
*H04N 19/136* (2014.01)
*H04N 19/176* (2014.01)
(Continued)

(52) U.S. Cl.
CPC ......... *H04N 19/136* (2014.11); *H04N 19/176* (2014.11); *H04N 19/186* (2014.11); *H04N 19/70* (2014.11)

(58) Field of Classification Search
CPC .. H04N 19/136; H04N 19/176; H04N 19/186; H04N 19/70
(Continued)

(56) References Cited

U.S. PATENT DOCUMENTS

2006/0023941 A1 2/2006 Drebin et al.
2015/0271514 A1 9/2015 Yoshikawa et al.
(Continued)

FOREIGN PATENT DOCUMENTS

CN 111343458 A 6/2020
CN 112422989 A * 2/2021 ............. G06N 3/045
(Continued)

OTHER PUBLICATIONS

He et al., "Checkerboard Context Model for Efficient Learned Image Compression," presented at the IEEE/CVF Conference on Computer Vision and Pattern Recognition (CVPR), held virtually, Jun. 19-25, 2021, 16 pages.
(Continued)

*Primary Examiner* — Kathleen M Walsh
(74) *Attorney, Agent, or Firm* — Fish & Richardson P.C.

(57) ABSTRACT

The present disclosure discloses image decoding and coding methods, apparatuses, devices, and storage media. In the present disclosure, an image bitstream is decoded and a feature reconstruction value corresponding to a current image feature obtained by decoding is determined; an enhanced feature value is obtained by performing feature enhancement on the feature reconstruction value; and a reconstructed image block is obtained by performing synthesis transformation on the enhanced feature value.

20 Claims, 9 Drawing Sheets

(51) Int. Cl.
　　H04N 19/186　　　(2014.01)
　　H04N 19/70　　　　(2014.01)
(58) Field of Classification Search
　　USPC .................................................... 375/240.08
　　See application file for complete search history.

(56)　　　　　　References Cited

U.S. PATENT DOCUMENTS

| | | |
|---|---|---|
| 2017/0200092 A1 | 7/2017 | Kisilev |
| 2019/0246102 A1 | 8/2019 | Cho et al. |
| 2020/0327309 A1 | 10/2020 | Cheng et al. |
| 2022/0279183 A1 | 9/2022 | Besenbruch et al. |
| 2023/0336784 A1 | 10/2023 | Esenlik et al. |

FOREIGN PATENT DOCUMENTS

| | | | | |
|---|---|---|---|---|
| CN | 113259676 A | 8/2021 | | |
| CN | 114025164 A | 2/2022 | | |
| CN | 114449276 A | 5/2022 | | |
| CN | 114463453 A | 5/2022 | | |
| CN | 114501010 A | 5/2022 | | |
| CN | 110971901 B | 8/2022 | | |
| CN | 115116451 A | 9/2022 | | |
| CN | 115278246 A | * 11/2022 | .............. | G06N 3/08 |
| KR | 20200138079 A | 12/2020 | | |
| TW | I870203 B | 1/2025 | | |
| WO | WO 2020143589 A1 | 7/2020 | | |
| WO | WO 2021196087 A1 | 10/2021 | | |
| WO | WO 2021220008 A1 | 11/2021 | | |
| WO | WO 2022086376 A1 | 4/2022 | | |
| WO | WO 2022128105 A1 | 6/2022 | | |
| WO | WO 2022221374 A1 | 10/2022 | | |
| WO | WO 2022227062 A1 | 11/2022 | | |

OTHER PUBLICATIONS

Office Action in Chinese Appln. No. 2023100559700, mailed on Sep. 30, 2025, 14 pages (with English translation).

Office Action in Chinese Appln. No. 202510247899.5, mailed on Oct. 13, 2025, 13 pages (with English translation).

Xiaoyang et al., "Development Trends of Video Encoding and Decoding Technology," Technology and Application, China Security and Protection, 2016, 3:56-60, 13 pages.

Notice of Allowance in Taiwanese Appln. No. 113101379, mailed on Nov. 4, 2024, 4 pages (with machine translation).

Office Action in Taiwanese Appln. No. 113101379, mailed on Jul. 23, 2024, 11 pages (with machine translation).

International Search Report and Written Opinion in International Appln. No. PCT/CN2024/071970, mailed on Mar. 29, 2024, 5 pages (with English translation).

Extended European Search Report in European Appln. No. 24741363.6, mailed on Apr. 21, 2026, 11 pages.

Office Action in Japanese Appln. No. 2025-540974, mailed on Feb. 3, 2026, 8 pages (with English Translation).

Soomro et al., "Impact of Image Enhancement Technique on CNN Model for Retinal Blood Vessels Segmentation," IEEE Access, Nov. 2019, 15 pages.

* cited by examiner

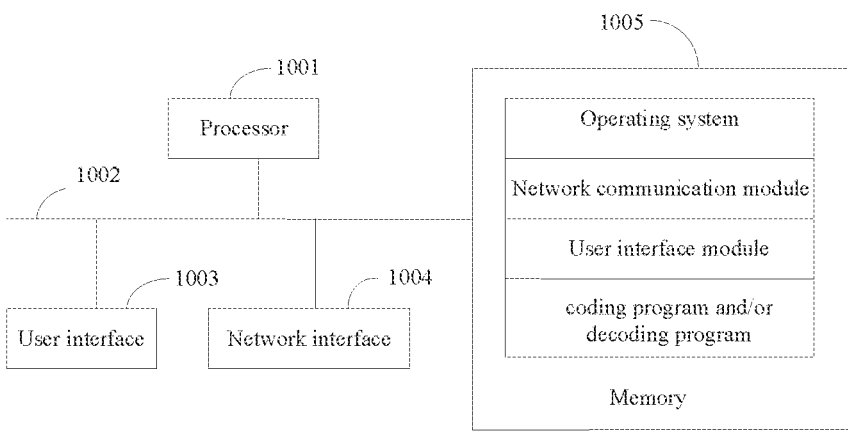

| Decode an image bitstream and determine a feature reconstruction value corresponding to a current image feature obtained by decoding | S10 |

↓

| Obtain an enhanced feature value by performing feature enhancement on the feature reconstruction value | S20 |

↓

| Obtain a reconstructed image block by performing synthesis transformation on the enhanced feature value | S30 |

FIG. 2

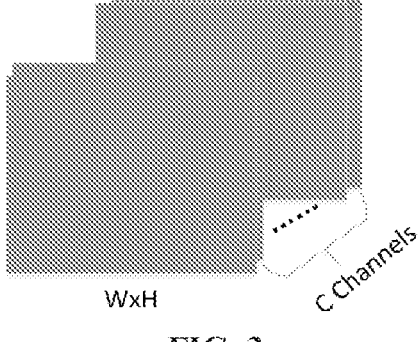

WxH                    C Channels

FIG. 3

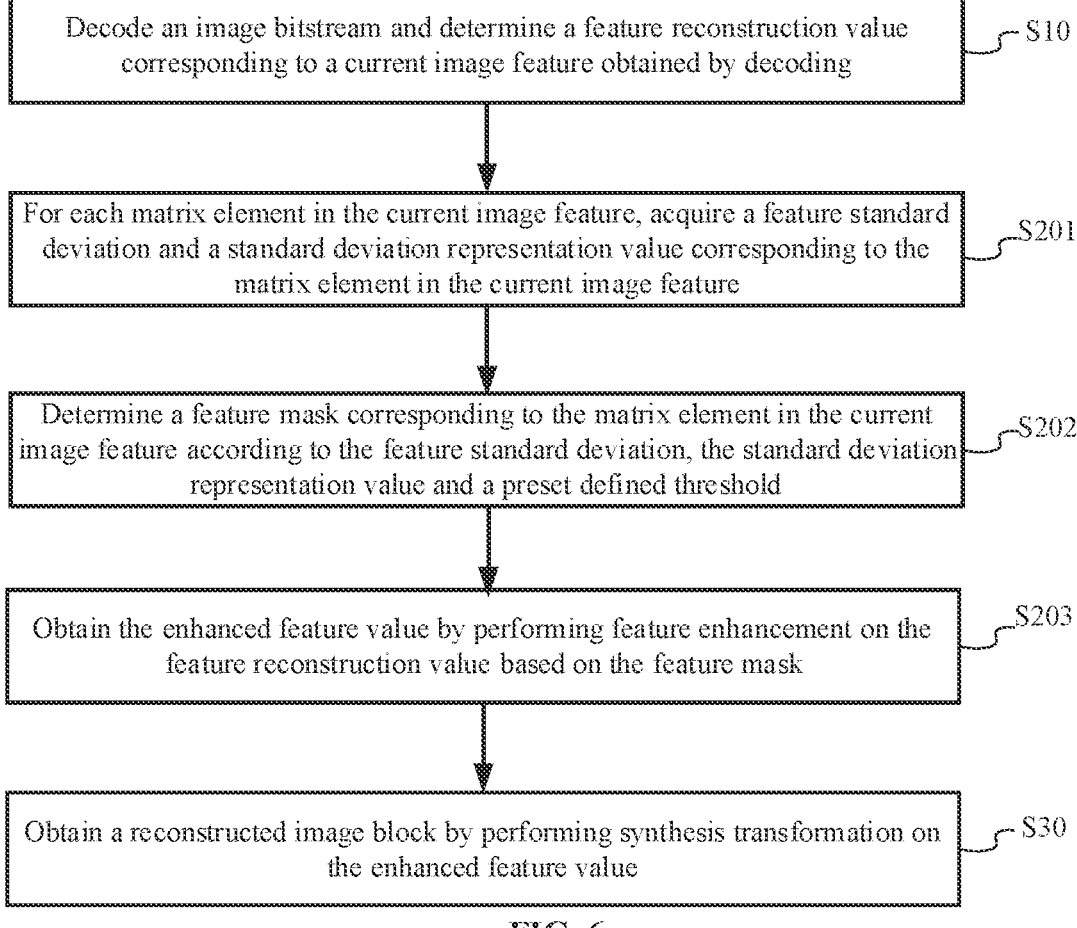

Decode an image bitstream and determine a feature reconstruction value corresponding to a current image feature obtained by decoding — S10

For each matrix element in the current image feature, acquire a feature standard deviation and a standard deviation representation value corresponding to the matrix element in the current image feature — S201

Determine a feature mask corresponding to the matrix element in the current image feature according to the feature standard deviation, the standard deviation representation value and a preset defined threshold — S202

Obtain the enhanced feature value by performing feature enhancement on the feature reconstruction value based on the feature mask — S203

Obtain a reconstructed image block by performing synthesis transformation on the enhanced feature value — S30

FIG. 6

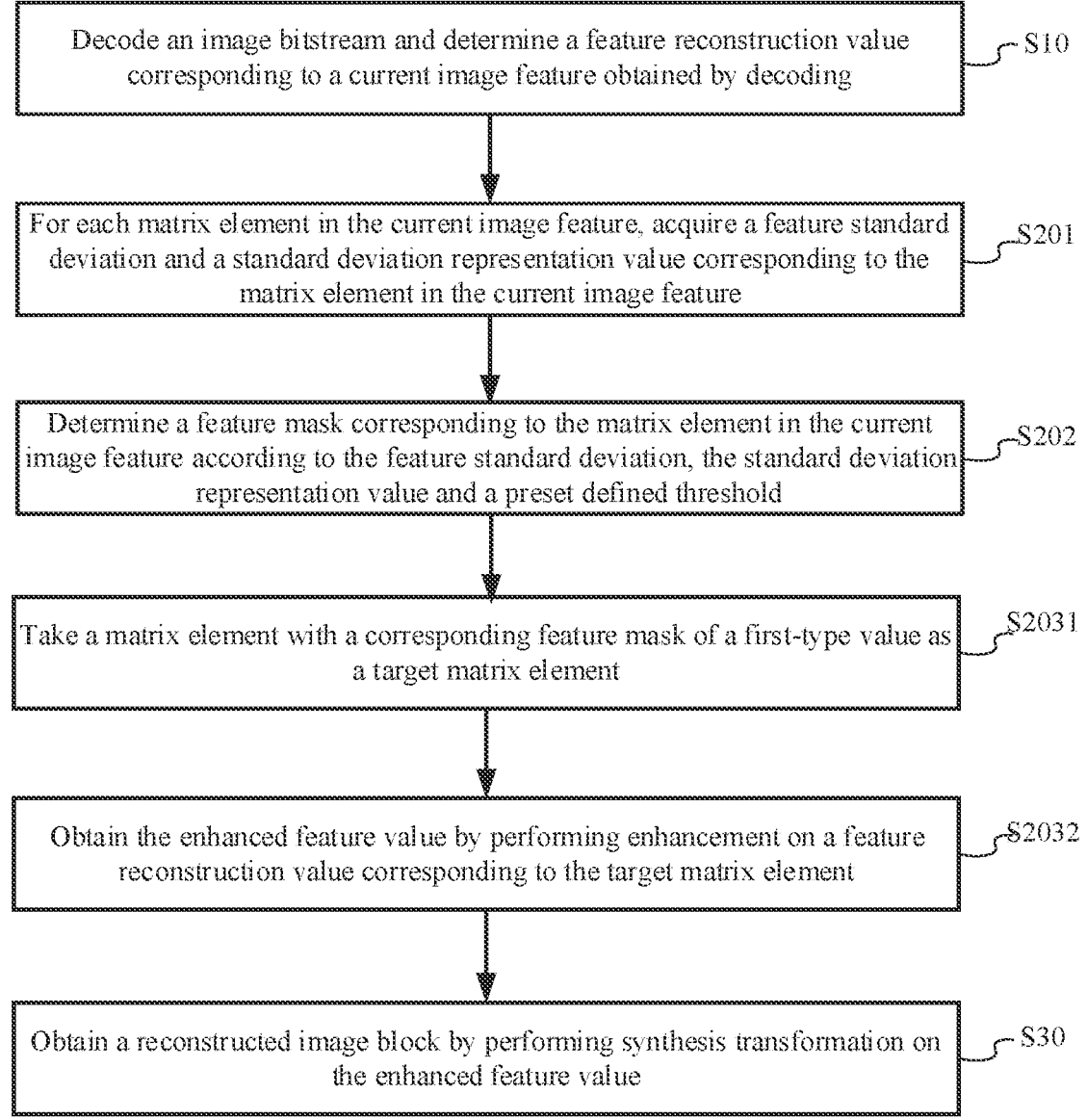

Decode an image bitstream and determine a feature reconstruction value corresponding to a current image feature obtained by decoding — S10

For each matrix element in the current image feature, acquire a feature standard deviation and a standard deviation representation value corresponding to the matrix element in the current image feature — S201

Determine a feature mask corresponding to the matrix element in the current image feature according to the feature standard deviation, the standard deviation representation value and a preset defined threshold — S202

Take a matrix element with a corresponding feature mask of a first-type value as a target matrix element — S2031

Obtain the enhanced feature value by performing enhancement on a feature reconstruction value corresponding to the target matrix element — S2032

Obtain a reconstructed image block by performing synthesis transformation on the enhanced feature value — S30

FIG. 7

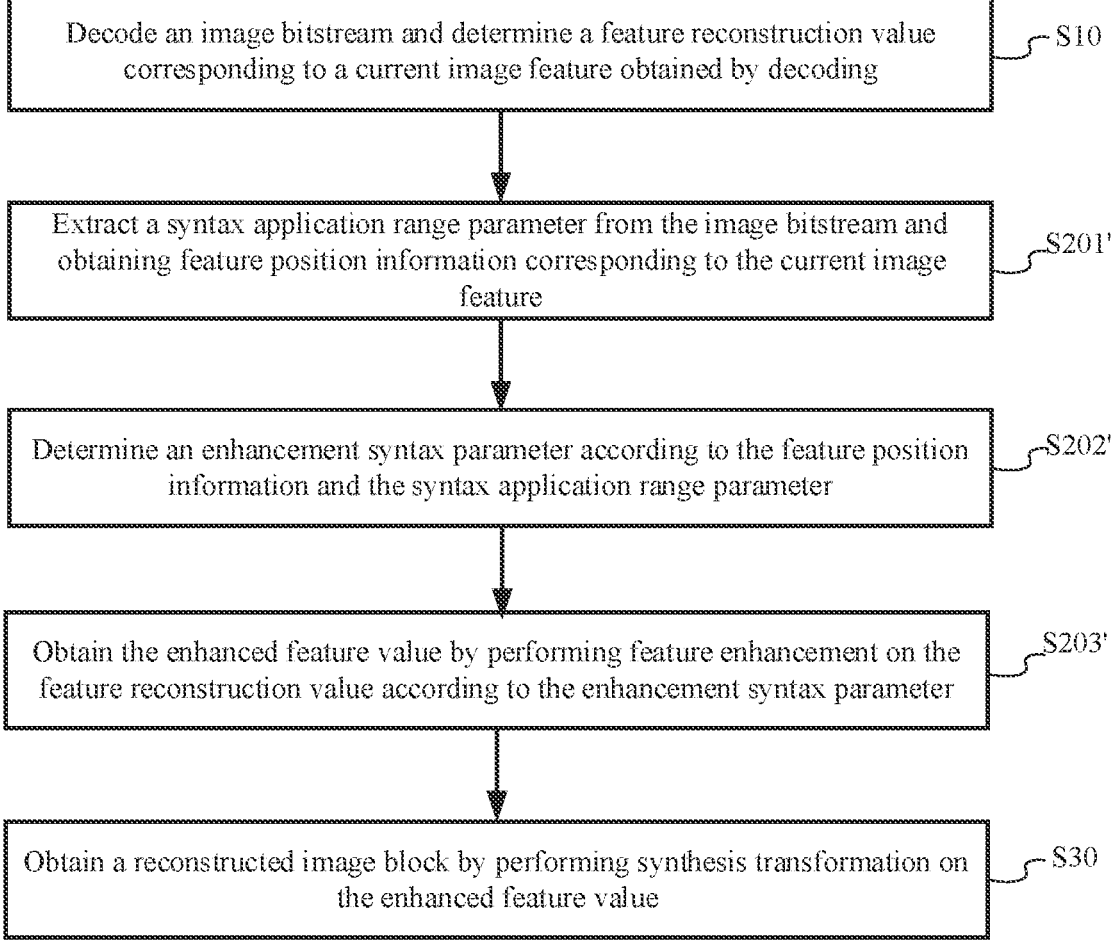

Decode an image bitstream and determine a feature reconstruction value corresponding to a current image feature obtained by decoding — S10

Extract a syntax application range parameter from the image bitstream and obtaining feature position information corresponding to the current image feature — S201'

Determine an enhancement syntax parameter according to the feature position information and the syntax application range parameter — S202'

Obtain the enhanced feature value by performing feature enhancement on the feature reconstruction value according to the enhancement syntax parameter — S203'

Obtain a reconstructed image block by performing synthesis transformation on the enhanced feature value — S30

FIG. 8

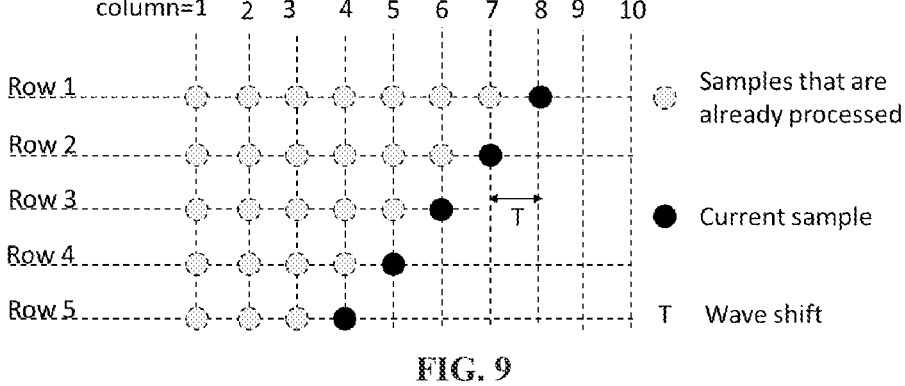

column=1  2  3  4  5  6  7  8  9  10

Row 1

Row 2

Row 3

Row 4

Row 5

Samples that are already processed

Current sample

T   Wave shift

FIG. 9

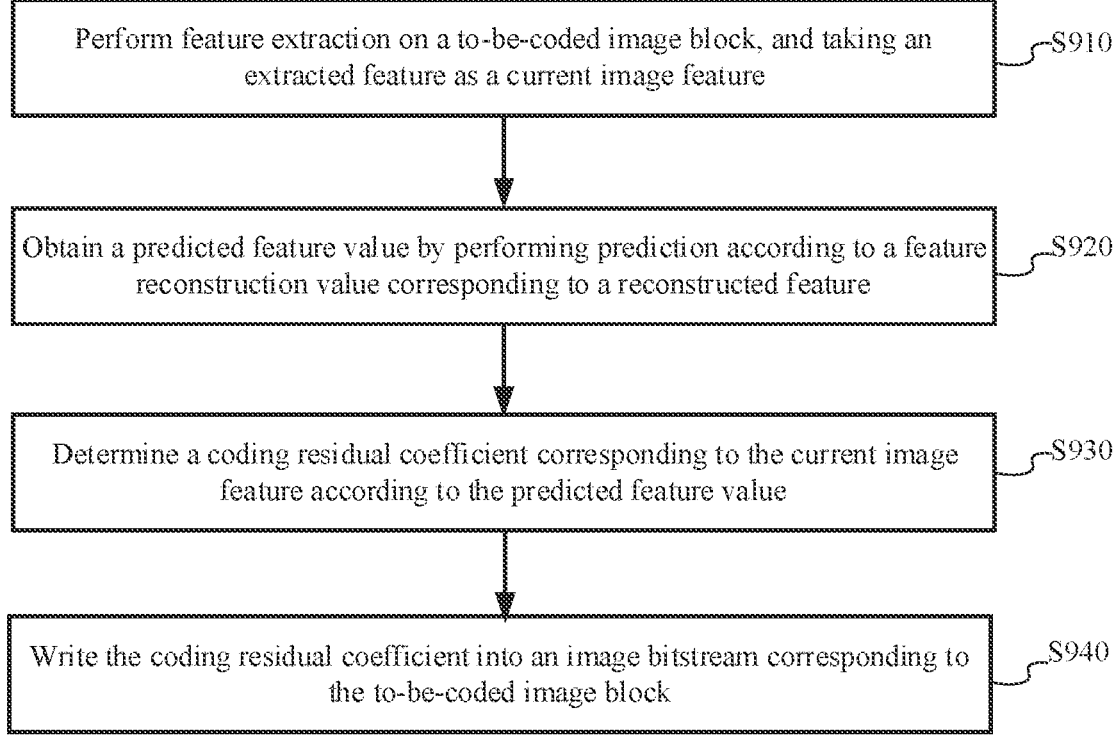

Perform feature extraction on a to-be-coded image block, and taking an extracted feature as a current image feature — S910

Obtain a predicted feature value by performing prediction according to a feature reconstruction value corresponding to a reconstructed feature — S920

Determine a coding residual coefficient corresponding to the current image feature according to the predicted feature value — S930

Write the coding residual coefficient into an image bitstream corresponding to the to-be-coded image block — S940

FIG. 10

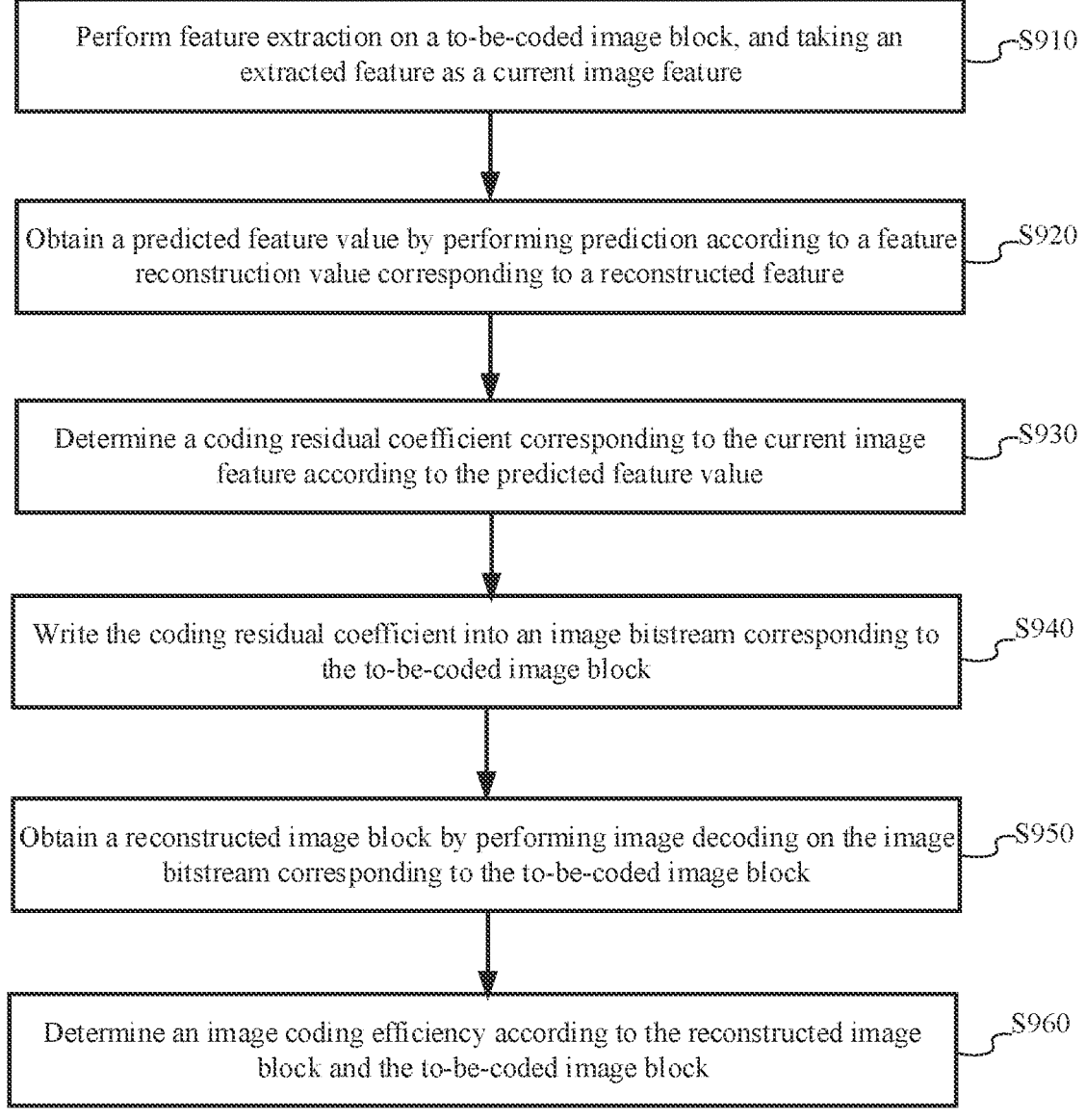

Perform feature extraction on a to-be-coded image block, and taking an extracted feature as a current image feature — S910

Obtain a predicted feature value by performing prediction according to a feature reconstruction value corresponding to a reconstructed feature — S920

Determine a coding residual coefficient corresponding to the current image feature according to the predicted feature value — S930

Write the coding residual coefficient into an image bitstream corresponding to the to-be-coded image block — S940

Obtain a reconstructed image block by performing image decoding on the image bitstream corresponding to the to-be-coded image block — S950

Determine an image coding efficiency according to the reconstructed image block and the to-be-coded image block — S960

FIG. 11

IMAGE DECODING METHOD AND APPARATUS, IMAGE CODING METHOD AND APPARATUS, DEVICE AND STORAGE MEDIUM

CROSS-REFERENCE TO RELATED APPLICATION

The present application is a U.S. National Stage of International Application No. PCT/CN2024/071970, filed on Jan. 12, 2024, which claims the benefit of priority to Chinese Application No. 202310055970.0, filed on Jan. 13, 2023, the contents of all of which are incorporated by reference herein in their entireties for all purposes.

TECHNICAL FIELD

The present disclosure relates to the field of image processing technologies, and in particular, to an image decoding method and apparatus, a coding method and apparatus, devices and a storage medium.

BACKGROUND

Nowadays, deep learning and neural networks continue to achieve breakthroughs in the field of video and image compression. Image coding technologies based on deep learning have significantly surpassed traditional coding standards in terms of coding performance. However, improving image quality of images reconstructed after compression using deep learning-based image coding technologies remains a significant challenge.

The above content is only used to assist in understanding the technical solution of the present disclosure and does not represent an acknowledgment that the above content is prior art.

SUMMARY

The main objective of the present disclosure is to provide an image decoding method and apparatus, a coding method and apparatus, devices and a storage medium, aiming to improve the technical problem of image quality of images reconstructed after compression based on deep learning image coding technology.

To achieve the above objective, the present disclosure provides an image decoding method, which includes the following steps:

decoding an image bitstream and determining a feature reconstruction value corresponding to a current image feature obtained by decoding;

obtaining an enhanced feature value by performing feature enhancement on the feature reconstruction value; and obtaining a reconstructed image block by performing synthesis transformation on the enhanced feature value.

In addition, to achieve the above objective, the present disclosure further provides an image decoding apparatus, which includes the following modules:

a bitstream decoding module, configured to decode an image bitstream and determining a feature reconstruction value corresponding to a current image feature obtained by decoding;

a feature enhancement module, configured to obtain an enhanced feature value by performing feature enhancement on the feature reconstruction value; and an image reconstruction module, configured to obtain a reconstructed image block by performing synthesis transformation on the enhanced feature value.

In addition, to achieve the above objective, the present disclosure further provides an image coding method, the image coding method including:

performing feature extraction on a to-be-coded image block, and taking an extracted feature as a current image feature;

obtaining a predicted feature value by performing prediction according to a feature reconstruction value corresponding to a reconstructed feature;

determining a coding residual coefficient corresponding to the current image feature according to the predicted feature value; and writing the coding residual coefficient into an image bitstream corresponding to the to-be-coded image block.

In addition, to achieve the above objective, the present disclosure further provides an image coding apparatus, the image coding apparatus including:

a feature extraction module, configured to perform feature extraction on a to-be-coded image block, and take an extracted feature as a current image feature;

a feature prediction module, configured to obtain a predicted feature value by performing prediction according to a feature reconstruction value corresponding to a reconstructed feature;

a residual calculation module, configured to determine a coding residual coefficient corresponding to the current image feature according to the predicted feature value; and a parameter writing module, configured to write the coding residual coefficient into an image bitstream corresponding to the to-be-coded image block.

In addition, to achieve the above objective, the present disclosure further provides a decoding device, where the decoding device includes: a processor, a memory, and a decoding program stored on the memory and executable on the processor, the decoding program, when executed by the processor, implementing the image decoding method as described above.

In addition, to achieve the above objective, the present disclosure further provides a coding device, where the coding device includes: a processor, a memory, and a decoding program and/or a coding program stored on the memory and executable on the processor, the decoding program, when executed by the processor, implementing the image decoding method as described above, and the coding program, when executed by the processor, implementing the image coding method as described above.

In addition, to achieve the above objective, the present disclosure further provides a computer-readable storage medium, where the computer-readable storage medium stores an image decoding program and/or an image coding program, the image decoding program, when executed, implementing the image decoding method as described above, and the image coding program, when executed, implementing the image coding method as described above.

In the present disclosure, an image bitstream is decoded and a feature reconstruction value corresponding to a current image feature obtained by decoding is determined; an enhanced feature value is obtained by performing feature enhancement on the feature reconstruction value; and a reconstructed image block is obtained by performing synthesis transformation on the enhanced feature value. Since feature enhancement is performed on the feature reconstruction value before image reconstruction, and the image reconstruction is then carried out based on the enhanced feature value, the distortion introduced during processes such as quantization of the image feature is reduced, thereby improving the image quality of the reconstructed image.

BRIEF DESCRIPTION OF DRAWINGS

FIG. 1 is a schematic diagram of a structure of an electronic device in a hardware operating environment according to an embodiment of the present disclosure.

FIG. 2 is a flowchart of a first embodiment of an image decoding method of the present disclosure.

FIG. 3 is a schematic diagram of a matrix structure according to an embodiment of the present disclosure.

FIG. 6 is a flowchart of a second embodiment of an image decoding method of the present disclosure.

FIG. 7 is a flowchart of a third embodiment of an image decoding method of the present disclosure.

FIG. 8 is a flowchart of a fourth embodiment of an image decoding method of the present disclosure.

FIG. 9 is a schematic diagram of a feature reconstruction sequence according to an embodiment of the present disclosure.

FIG. 10 is a flowchart of a first embodiment of an image coding method of the present disclosure.

FIG. 11 is a flowchart of a second embodiment of an image coding method of the present disclosure.

Figure 4:
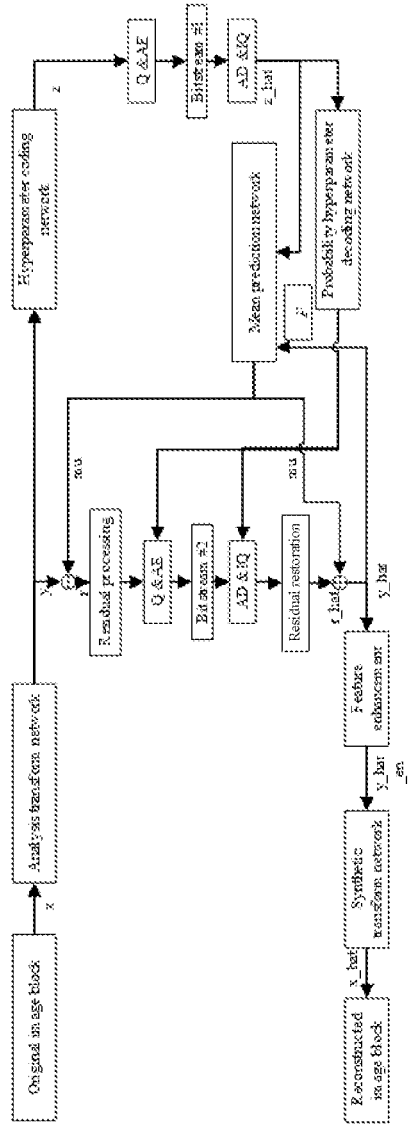
FIG. 4 is a schematic diagram of an image coding and decoding process according to an embodiment of the present disclosure.

The realization, functional characteristics and advantages of the present disclosure will be further described with reference to the accompanying drawings in conjunction with the embodiments.

DETAILED DESCRIPTION

It should be understood that the specific embodiments described herein are only for explaining the present disclosure and are not intended to limit the present disclosure.

Referring to FIG. 1, FIG. 1 is a schematic diagram of a structure of a coding device or a decoding device in a hardware operating environment according to an embodiment of the present disclosure.

As shown in FIG. 1, the electronic device may include: a processor 1001, such as a Central Processing Unit (CPU), a communication bus 1002, a user interface 1003, a network interface 1004, and a memory 1005. The communication bus 1002 is configured to realize connection communication between these components. The user interface 1003 may include a Display and an input unit such as a Keyboard, and the user interface 1003 may further include a standard wired interface and a wireless interface. The network interface 1004 may include a standard wired interface and a wireless interface (such as a Wireless-Fidelity (Wi-Fi) interface). The memory 1005 may be a high-speed Random Access Memory (RAM) or a stable Non-Volatile Memory (NVM), such as a disk memory. The memory 1005 may further be a storage apparatus independent of the aforementioned processor 1001.

Those skilled in the art can understand that the structure shown in FIG. 1 does not constitute a limitation on the electronic device, and it may include more or fewer components than those shown, or combine certain components, or arrange different components.

As shown in FIG. 1, the memory 1005, as a storage medium, may include an operating system, a network communication module, a user interface module, and a decoding and/or coding program.

In the electronic device shown in FIG. 1, the network interface 1004 is mainly used for data communication with a network server; the user interface 1003 is mainly used for data interaction with users; the processor 1001 and memory 1005 in the electronic device of the present disclosure may be disposed in a coding device or a decoding device, and the electronic device calls a coding program and/or a decoding program stored in the memory 1005 through the processor 1001 to execute the image decoding method or the image coding method provided in the embodiments of the present disclosure.

An embodiment of the present disclosure provides an image decoding method, referring to FIG. 2, which is a flowchart of a first embodiment of an image decoding method of the present disclosure.

In this embodiment, the image decoding method includes the following steps.

Step S10: decoding an image bitstream and determining a feature reconstruction value corresponding to a current image feature obtained by decoding.

It should be noted that the execution subject of this embodiment may be a decoding device when decoding image data, and the decoding device may be an electronic device such as a personal computer, a server, etc. Of course, it can also be other devices that can realize the same or similar functions, and this embodiment is not limited to this. In this embodiment and the following embodiments, the image decoding method of the present disclosure will be explained by taking the decoding device as an example.

In the process of image coding, a coding device generally decodes a coded image bitstream after the coding is completed, and determines whether parameters used in the coding need to be adjusted according to the image quality of the decoded image, so the execution subject of this embodiment may also be the coding device.

It should be noted that the image bitstream may be a bitstream generated by the coding device after coding the image data that needs to be compressed and coded. When the decoding device decodes the image bitstream, it extracts image features of the coded image data from the image bitstream. An image feature obtained during a current decoding process is referred to as a current image feature. A feature reconstruction value may be an image feature obtained after performing feature restoration on the current image feature during the decoding process.

In the specific processing process, when coding the image data, the coding device can divide the image data into one image block for processing, and of course, the image data can also be divided into multiple image blocks for processing, which is not limited by this embodiment.

The technical terms involved in image coding or decoding include: Joint Photographic Experts Group (JPEG), Joint Photographic Experts Group Artificial Intelligence (JPEG-AI), Entropy Encoding, Neural Network (NN), Convolutional Neural Network (CNN), feature, Rate-Distortion Optimized, etc., which are explained here.

Joint Photographic Experts Group (JPEG) is a standard for continuous-tone still image compression, with file extensions of .jpg or .jpeg, and is the most commonly used image file format. It mainly adopts a joint coding mode of Differential Pulse Code Modulation (DPCM), Discrete Cosine Transform (DCT) and entropy encoding to remove redundant images and color data, which belongs to lossy compression format. It can compress images in a small storage space, which will cause damage to image data to some extent. Especially when using an excessively high compression ratio, the quality of the image restored after final decompression will be reduced. If high-quality images are desired, an excessively high compression ratio should not be used.

The scope of JPEG AI is to create a learning-based image coding standard that provides a single-stream, compact compressed-domain representation, targeting both human visualization and significantly improving compression efficiency compared to commonly used image coding standards at the sane subjective quality, as well as effective performance for image processing and computer vision tasks. JPEG AI is aimed at a wide range of applications, such as cloud storage, visual surveillance, autonomous vehicles and devices, image acquisition, storage, and management, real-time monitoring of visual data, and media distribution. The goal is to design a coding solution that significantly improves the compression efficiency of commonly used coding standards at the same subjective quality and provides effective compressed-domain processing for machine learning-based image processing and computer vision tasks. Other key requirements include hardware/software implementation-friendly coding and decoding, support for 8-bit and 10-bit depths, efficient coding of images using text and graphics, and progressive decoding.

Entropy encoding refers to coding that does not lose any information during the coding process according to the principle of entropy. Information entropy is average information content (a measure of uncertainty) of the information source. Common entropy encoding includes Shannon coding, Huffman coding and arithmetic coding.

In the present disclosure, the neural network refers to an artificial neural network rather than a biological neural network. A neural network is a computational model composed of a large number of interconnected nodes (or named as neurons). In an artificial neural network, neuron processing units may represent different objects, such as features, letters, concepts, or some meaningful abstract patterns. The types of processing units in the network are divided into three categories: input units, output units, and hidden units. Input units receive signals and data from the external world; output units realize the output of the system's processing results; hidden units are located between input and output units and cannot be observed from outside the system. Connection weights between neurons reflect connection strengths between units, and representation and processing of information are embodied in the connection relationships of the network's processing units. An artificial neural network is a non-programmed, brain-like information processing method. Its essence is to achieve a parallel distributed information processing function through network transformations and dynamic behaviors, and to mimic the information processing functions of the human brain's neural system to varying degrees and levels. Currently, in the field of video processing, commonly used neural networks include CNN, RNN, Fully Connected Network (FCN), etc.

A Convolutional Neural Network (CNN) is a type of feedforward neural network and one of the most representative network structures in deep learning technology. Its artificial neurons can respond to surrounding units within a certain coverage range, demonstrating excellent performance in large-scale image processing. Generally, a basic structure of a CNN includes two layers: one is a feature extraction layer (also named as a convolutional layer), where an input of each neuron is connected to a local receptive field of a previous layer and a feature of that local is extracted. Once the local feature is extracted, its positional relationship with other features is also determined. The other is a feature mapping layer (also named as an activation layer), where each computational layer of the network is composed of multiple feature mappings, and each feature mapping is a plane where all neurons have equal weights. The feature mapping structure can adopt Sigmoid function. ReLU function, Leaky-ReLU function, PReLU function and Generalized Difference Network (GDN) function as activation functions for the convolutional network. Additionally, since neurons on a mapping plane share weights, the number of free parameters in the network is reduced. One of the advantages of CNN compared with the traditional image processing algorithm is that it avoids the complicated preprocessing process of images (extracting artificial features, etc.), and can directly input original imaged for end-to-end learning. One of the advantages of CNN compared with traditional neural networks is that the traditional neural networks are fully connected, that is, the neurons from the input layer to the hidden layer are all connected, which will lead to a huge number of parameters, making network training time-consuming and even difficult to train, while CNN avoids this difficulty through local connection and weight sharing.

The feature involved in the present disclosure is a three-dimensional feature matrix of CxWxH (as shown in FIG. 3, which is a schematic diagram of a matrix structure of this embodiment). C represents the number of channels, H represents the feature height, and W represents the feature width. The feature matrix can be either an input or output of a neural network.

There are two major indicators for evaluating coding efficiency: bit rate and Peak Signal to Noise Ratio (PSNR). The smaller the bit stream, the greater the compression ratio. The larger the PSNR, the better the image coding efficiency. During mode selection, a discriminant formula is essentially a comprehensive evaluation of these two factors. A cost corresponding to a mode is: $J(mode)=D+\lambda*R$. Here, D represents Distortion, usually measured by Sum of the Squared Errors (SSE), which is a mean square sum of differences between a reconstructed block and a source image: $\lambda$ is Lagrange multiplier; R is an actual number of bits required for image block coding in this mode, including total bits required for coding mode information, motion information, residuals, etc. When selecting a mode, using a Rate-Distortion Optimization (RDO) principle to compare and decide on the coding mode can usually ensure the best coding performance.

In a possible implementation of the present disclosure, numerical values of image features may be large or even highly complex. To improve coding efficiency, when coding the image features, the coding device may first perform residual calculation on the image features and then code the obtained residual data. Consequently, during the decoding process of the image data, a corresponding restoration process is required to ensure that a feature reconstruction value close to an original image feature before coding can be obtained. In this case, step S10 of the present embodiment may include:

decoding the image bitstream, and determining a residual reconstruction value corresponding to the current image feature obtained by decoding;

obtaining a predicted feature value by performing prediction according to a feature reconstruction value of a reconstructed feature; and determining the feature reconstruction value corresponding to the current image feature according to the residual reconstruction value and the predicted feature value.

It should be noted that if the coding device performs coding after calculating the residual data, then only the residual reconstruction value corresponding to the current image feature can be obtained by decoding the image bitstream. The reconstructed feature may be a part of the image feature for which feature restoration has been completed. The obtaining a predicted feature value by performing prediction according to a feature reconstruction value of a reconstructed feature may be performed using a mean prediction network and according to the feature reconstruction value of the reconstructed feature to obtain the predicted feature value.

For ease of understanding, reference is now made to FIG. 4, which is a schematic diagram of an image coding and decoding process in this embodiment. In the figure, Bitstream #1 is an auxiliary bitstream, and Bitstream #2 is an image bitstream. As shown in FIG. 4, feature extraction is performed on an original image block (i.e., the image data that the coding device needs to coded) through an analysis transform network to obtain an image feature y. Simultaneously, auxiliary information z_hat is calculated through a hyperparameter coding network, and then a predicted feature value mu is obtained through a mean prediction network. The coding device then performs residual processing to obtain an original residual value r of the current feature. After residual processing and quantization (Q& AE), an obtained coding residual coefficient r_coef is written into the image bitstream (Bitstream #2).

Subsequently, when the decoding device processes the image bitstream (Bitstream #2), it extracts the coding residual coefficient r_coef from the bitstream. It then performs inverse quantization and residual restoration (AD&IQ) on the coding residual coefficient to obtain a residual reconstruction value r_hat corresponding to the current image feature. After that, it performs prediction using the mean prediction network based on a feature reconstruction value y_hat of the reconstructed feature to obtain the predicted feature value mu. The feature reconstruction value y_hat corresponding to the current image feature is then determined based on the predicted feature value and the residual reconstruction value. Feature enhancement is subsequently performed on the feature reconstruction value to obtain an enhanced feature value y_hat_en. Finally, synthetic coding is performed on enhanced feature values through a synthetic transform network to obtain a reconstructed image block x_hat. Parameters used in the Q&AE and AD&IQ processes are both obtained by processing the auxiliary information z_hat through a probability hyperparameter decoding network.

The analysis transform network, the hyperparameter coding network, the probability hyperparameter decoding network, and the synthetic transform network may all be neural networks constructed based on deep learning.

In practical use, determining the feature reconstruction value corresponding to the current image feature based on the residual reconstruction value and the predicted feature value may be achieved by adding the residual reconstruction value and the predicted feature value together and using the resulting sum as the feature reconstruction value corresponding to the current image feature. During prediction, a feature reconstruction value of a reconstructed feature which is close to a position of the current image feature can be used for prediction.

In a possible implementation of the present disclosure, to further enhance coding efficiency, after calculating the residual data during the image coding process, the coding device may perform additional operations such as residual processing or quantization on the residual data before writing the obtained coding residual coefficients into the image bitstream. In this case, determining a residual reconstruction value corresponding to the current image feature obtained by decoding may involve decoding the image bitstream, extracting a coding residual coefficient corresponding to the current image feature, performing inverse quantization and residual restoration on the coding residual coefficient, and obtaining the residual reconstruction value corresponding to the current image feature.

In a possible implementation of the present disclosure, when performing prediction, an enhanced feature value of reconstructed feature can also be utilized for prediction. In this case, Step S10 in this embodiment may include:

decoding the image bitstream, and determining a residual reconstruction value corresponding to the current image feature obtained by decoding;

obtaining the predicted feature value by performing prediction according to an enhanced feature value of the reconstructed feature; and determining the feature reconstruction value corresponding to the current image feature according to the residual reconstruction value and the predicted feature value.

It should be noted that in some cases, during the coding process of image data at the coding device, when calculating the residual value, the enhanced feature value of reconstructed feature may be utilized for prediction to determine the predicted feature value corresponding to the currently coded image feature. The coding residual coefficient for the currently coded image feature are then calculated based on the predicted feature value. During the decoding process, the same approach is adopted. Prediction is performed using a mean prediction network according to the enhanced feature value of the reconstructed feature to obtain the predicted feature value. The residual reconstruction value and the predicted feature value are then added together to obtain the feature reconstruction value corresponding to the current image feature.

Figure 5:
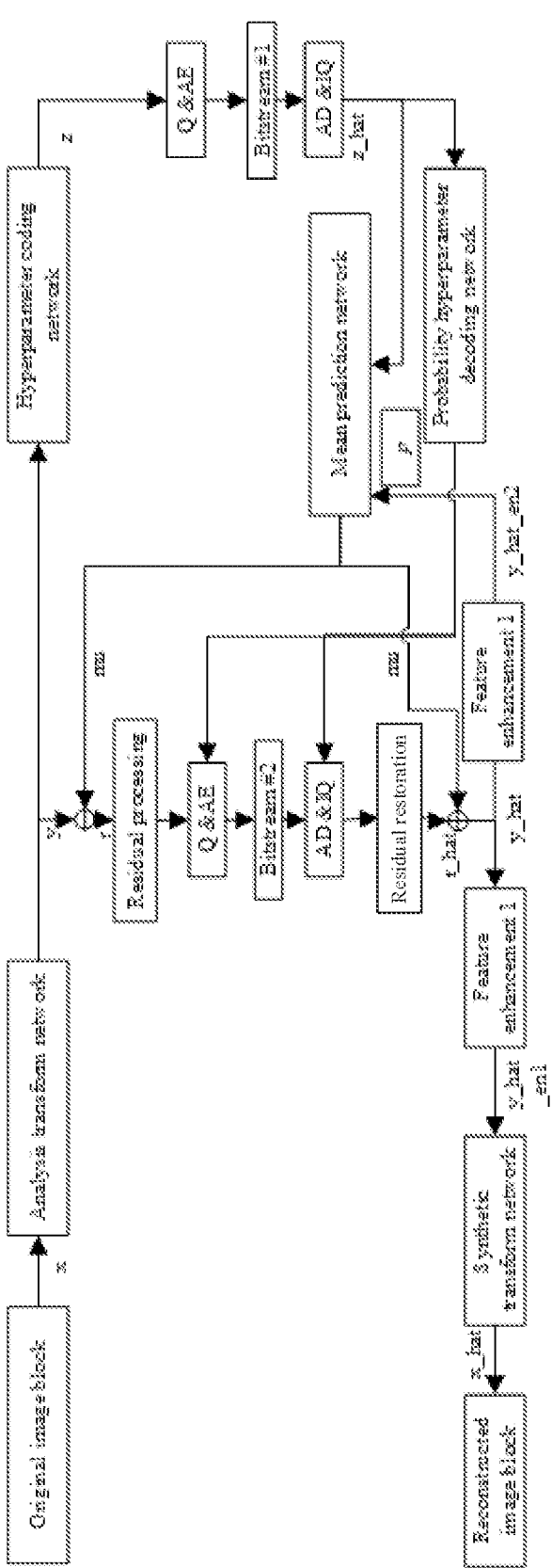
FIG. 5 is a schematic diagram of an image coding and decoding process according to an embodiment of the present disclosure.

For ease of understanding, reference is now made to FIG. 5, which is a schematic diagram of an image coding and decoding process in this embodiment. As shown in FIG. 5, a processing flow during the coding and decoding of image data is generally similar to that described in FIG. 4 above. However, the difference lies in the decoding process. After obtaining the feature reconstruction value of the current image feature, a first feature enhancement mode is applied to perform feature enhancement on the feature reconstruction value (i.e., Feature Enhancement 1 in the figure). An obtained first enhanced feature value y_hat_en1 is then input into a synthetic transform network for synthetic transform processing to obtain the reconstructed image block x_hat. Simultaneously, a second feature enhancement mode is also applied to perform feature enhancement on the feature reconstruction value (i.e., Feature Enhancement 2 in the figure). An obtained second enhanced feature value y_hat_en2 is then input into the mean prediction network. When processing other image features subsequently, the current image feature is treated as reconstructed feature, and the second enhanced feature value will be used for the reconstruction to calculate the predicted feature value.

It should be noted that the purpose of Feature Enhancement 2 is to generate subsequent predicted feature values as shown in FIG. 5. Therefore, it is often performed column by column (the columns may be diagonal, not necessarily vertical), and the features of the entire image (or the entire image block) cannot be completed simultaneously. In contrast, when Feature Enhancement 1 is performed, the features of the entire image (or the entire image block) have usually already been reconstructed, so feature enhancement can be executed in parallel for the entire image (or the entire image block).

In practical use, feature enhancement modes for the enhanced feature value of reconstructed feature and the enhanced feature value corresponding to the current image feature may be the same or different. That is, feature enhancement processes of the first feature enhancement mode and the second feature enhancement mode may be identical. In this case, y_hat_en1 equals y_hat_en2, and the decoding device only needs to decode one set of relevant syntax parameters from the image bitstream. Of course, depending on actual needs, the first feature enhancement mode and the second feature enhancement mode can also be set as different processes. In this case, the decoding device needs to decode two sets of syntax parameters from the image bitstream.

In specific applications, administrators of the decoding device or coding device may further set configuration parameters. By setting these configuration parameters, they can allow skipping the first feature enhancement mode and/or the second feature enhancement mode, i.e., directly setting y_hat_en1 and/or v_hat_en2 equal to y_hat. These configuration parameters can be set in the image bitstream. Of course, other methods can also be attempted to set the configuration parameters, and this embodiment does not impose any restrictions in this regard.

In a possible implementation of the present disclosure, the coding device may pre-write a syntax flag in the image bitstream to indicate whether the first feature enhancement mode and the second feature enhancement mode use exactly the same parameters. The decoding device can then determine, based on the syntax flag read from the image bitstream, whether the first feature enhancement mode and the second feature enhancement mode use exactly the same parameters. For example, the coding device uses a 1-bit syntax flag, useSameParaFlag, to characterize whether the first feature enhancement mode and the second feature enhancement mode use exactly the same syntax parameters. If the decoding device reads useSameParaFlag=1, it indicates that the first feature enhancement mode and the second feature enhancement mode use exactly the same syntax parameters. If the decoding device reads useSamePara-Flag=0, it indicates that the first feature enhancement mode and the second feature enhancement mode use completely different syntax parameters.

In a possible implementation of the present disclosure, the syntax parameters involved in the feature enhancement mode can be as shown in the following table:

TABLE 1

| Syntax Parameter Semantics Table | | |
| --- | --- | --- |
| Name | Coding Length | Semantics |
| numFilters | 8 bits | Indicates the number of sets of syntax parameters. If the value is N, then the range of idx below is 0~N-1. |
| applicationList[idx] | 2 bits | Indicates which component the idx-th set of parameters is used for. 0 indicates both luminance and chrominance components, 1 indicates only luminance component, 2 indicates only chrominance component, and 3 indicates neither. |
| preciseList[idx][0] | 1 bit | 0 indicates a precision of 1/100, and 1 indicates a precision of 1/10000. preciseList[idx][0] represents the precision of thrList. If the precision is 1/100, the actual value of thrList[idx] is the decoded value of thrList[idx] divided by 100. |
| preciseList[idx][1] | 1 bit | 0 indicates a precision of 1/100, and 1 indicates a precision of 1/10000. preciseList[idx][1] represents the precision of scaleList. |
| greaterList[idx] | 1 bit | 1 indicates greater than a certain threshold, and 0 indicates less than a certain threshold. |
| scaleList[idx][0] | 8/16 bits | The scaling factor Scale1[idx] mentioned above. The coding length depends on preciseList[idx][0]. If preciseList[idx][0] is 0, indicating a precision of 1/100, then 8-bit coding is used; if preciseList[idx][0] is 1, indicating a precision of 1/10000, then 16-bit coding is used. |
| scaleList[idx][1] | 8/16 bits | The scaling factor Scale2[idx] mentioned above (if any). The coding |

TABLE 1-continued

| Syntax Parameter Semantics Table | | |
| --- | --- | --- |
| Name | Coding Length | Semantics |
| | | length depends on the precision indicated by preciseList[idx][1], similar to the above. |
| thrList[idx] | 8/16 bits | The threshold parameter. The coding length depends on the precision indicated by preciseList[idx][0], similar to the above. |

In a possible implementation of the present disclosure, based on the syntax parameters in Table 1, additional parameters such as blockSizeList[idx] and modeList[idx] can also be included. The coding length of blockSizeList[idx] can be 8 bits, with the semantics being: it targets a block size of N×N, If N is 1, it indicates processing based on each pixel. Specifically, if N is greater than 1, a representative value for the N×N block is obtained through methods such as taking the minimum, maximum, or mean value. The representative value is then enhanced using the feature enhancement method of the present disclosure to obtain a new representative value. The enhanced value for the N×N block is then set to this new representative value. The coding length of modeList[idx] can be 3 bits, with the semantics being: values 1-4 respectively indicate min, avg, max, and max pool for upsampling and downsampling (for block sizes not equal to 1×1). A value of 5 indicates that a set of filters has 2 scales. In this case, the parameters are as shown in Table 2:

TABLE 2

| Syntax Parameter Semantics Table | | |
| --- | --- | --- |
| Name | Coding Length | Semantics |
| numFilters | 8 bits | Indicates the number of sets of adjustment parameters. If the value is N, then the range of idx below is 0 to N-1. |
| applicationList[idx] | 2 bits | Indicates which component the idx-th set of parameters is used for. 0 indicates both luminance and chrominance components, 1 indicates onlyluminance component, 2 indicates only chrominance component, and 3 indicates neither. |
| preciseList[idx][0] | 1 bit | 0 indicates a precision of 1/100, and 1 indicates a precision of 1/10000. preciseList[idx][0] represents the precision of thrList, and preciseList[idx][1] represents the precision of scaleList. |
| preciseList[idx][1] | 1 bit | Same as in Table 1. |
| greaterList[idx] | 1 bit | 1 indicates greater than a certain threshold, and 0 indicates less than a certain threshold. |
| blockSizeList[idx] | 8 bits | Targets a block size of N×N. If N is 1, it indicates processing based on each pixel. |
| modeList[idx] | 3 bits | Values 1~4 respectively indicate min, avg, max, and max pool for upsampling and downsampling (for block sizes not equal to 1x1). A value of 5 indicates that a set of filters has 2 scales. |
| scaleList[idx][0] | 8/16 bits | The scaling factor. The coding length depends on the precision indicated by preciseList[idx][0]. If preciseList[idx][0] is 0, indicating a precision of 1/100, then 8-bit coding is used; if preciseList[idx][0] is 1, indicating a precision of 1/10000, then 16-bit coding is used. |
| scaleList[idx][1] | 8/16 bits | The scaling factor coded only when modeList[idx] is 5. The coding length depends on the precision indicated by preciseList[idx][1], similar to the above. |

TABLE 2-continued

| Syntax Parameter Semantics Table | | |
| --- | --- | --- |
| Name | Coding Length | Semantics |
| thrList[idx] | 8/16 bits | The threshold parameter. The coding length depends on the precision indicated by preciseList[idx][0], similar to the above. |

Step S20: obtaining an enhanced feature value by performing feature enhancement on the feature reconstruction value.

It should be noted that during the coding process of image data, the image features undergo quantization and other processing steps, which may introduce some distortion. Therefore, feature enhancement can be performed on the feature reconstruction value(s) first, and then image reconstruction can be carried out based on the enhanced feature value(s) to improve the image quality of the reconstructed image.

Step S30: obtaining a reconstructed image block by performing synthesis transformation on the enhanced feature value.

It should be noted that obtaining a reconstructed image block by performing synthesis transformation on the enhanced feature value can be achieved by processing the enhanced feature value using a pre-constructed synthetic transform network. The synthetic transform network can be constructed based on deep learning or neural networks.

It can be understood that if the coding device processes the image data as a single image block during the coding process, the reconstructed image block obtained at this time is the completed reconstructed image data corresponding to the image data. However, if the coding device divides the image data into multiple image blocks for processing during the coding process, the reconstructed image block obtained at this time will only be reconstructed image data corresponding to a certain image block in the image data.

In this embodiment, an image bitstream is decoded and a feature reconstruction value corresponding to a current image feature obtained by decoding is determined; an enhanced feature value is obtained by performing feature enhancement on the feature reconstruction value; and a reconstructed image block is obtained by performing synthesis transformation on the enhanced feature value. Since feature enhancement is performed on the feature reconstruction value before image reconstruction, and the image reconstruction is then carried out based on the enhanced feature value, the distortion introduced during processes such as quantization of the image feature is reduced, thereby improving the image quality of the reconstructed image.

Referring to FIG. 6, FIG. 6 is a flowchart of a second embodiment of an image decoding method of the present disclosure.

Based on the first embodiment mentioned above, Step S20 of the image decoding method in this embodiment includes:

Step S201: for each matrix element in the current image feature, acquiring a feature standard deviation and a standard deviation representation value corresponding to the matrix element in the current image feature.

It should be noted that the current image feature can be a three-dimensional feature matrix, and its three-dimensional dimensions can be represented by c, i, and j, where c represents a channel identifier, and i and j respectively represent a feature height and a feature width. The feature standard deviation corresponding to a matrix element can be a standard deviation between a feature corresponding to the matrix element and a mean feature value. The standard deviation representation value is used to indicate whether the standard deviation corresponding to the matrix element is a large standard deviation.

The standard deviation representation value can be classified into a first-type representation value and a second-type representation value (for simplicity, they can be represented as true and false, where true is the first-type representation value and false is the second-type representation value). If a standard deviation representation value corresponding to a matrix element is the first-type representation value, it indicates that the standard deviation corresponding to the matrix element is a large standard deviation; and if a standard deviation representation value corresponding to a matrix element is the second-type representation value, it indicates that the standard deviation corresponding to the matrix element is not a large standard deviation.

Step S202: determining a feature mask corresponding to the matrix element in the current image feature according to the feature standard deviation, the standard deviation representation value and a preset defined threshold.

It should be noted that the feature mask can be a representation value used to indicate whether feature enhancement should be performed on a feature reconstruction value corresponding to a matrix element. The feature mask can be classified into a first-type value and a second-type value (for simplicity, they can be represented as true and false, where true is the first-type value and false is the second-type value). If a feature mask corresponding to a matrix element is the first-type value, it indicates that feature enhancement needs to be performed on the feature reconstruction value corresponding to the matrix element; if a feature mask corresponding to a matrix element is the second-type value, it indicates that feature enhancement does not need to be performed on the feature reconstruction value corresponding to the matrix element.

In practical use, a preset enhancement condition can be set in advance to determine whether the feature standard deviation and the standard deviation representation value corresponding to the matrix element meet the preset enhancement condition, thereby setting the feature mask of the matrix element. In this case, Step S202 in this embodiment may include:

in a case that the feature standard deviation and the standard deviation representation value corresponding to the matrix element meet a preset enhancement condition, setting the feature mask corresponding to the matrix element as a first-type value; and in a case that the feature standard deviation and the standard deviation representation value corresponding to the matrix element do not meet the preset enhancement condition, setting the feature mask corresponding to the matrix element as a second-type value.

It can be understood that if the feature standard deviation and the standard deviation representation value corresponding to the matrix element meet the preset enhancement condition, it indicates that feature enhancement needs to be performed on the feature reconstruction value corresponding to the matrix element. Therefore, the feature mask corresponding to the matrix element can be set as the first-type value.

However, if the feature standard deviation and the standard deviation representation value corresponding to the matrix element do not meet the preset enhancement condition, it indicates that no feature enhancement is needed on the feature reconstruction value corresponding to the matrix element. Therefore, the feature mask corresponding to the matrix element can be set as the second-type value.

In specific implementations, feature enhancement can be performed on a matrix element with a large standard deviation, and the corresponding feature standard deviation is greater than a certain threshold, and feature enhancement may be performed on a matrix element with a non-large standard deviation, and the corresponding feature standard deviation is less than a certain threshold. The preset defined threshold can be set in advance by the administrators of the coding device or the decoding device. In this case, before the step of in a case that the feature standard deviation and the standard deviation representation value corresponding to the matrix element meet a preset enhancement condition, setting the feature mask corresponding to the matrix element as a first-type value, the following steps may further be included:

in a case that the feature standard deviation corresponding to the matrix element is greater than the preset defined threshold and the standard deviation representation value is a first-type representation value, determining that the feature standard deviation and the standard deviation representation value corresponding to the matrix element meet the preset enhancement condition; or, in a case that the feature standard deviation corresponding to the matrix element is less than the preset defined threshold and the standard deviation representation value is a second-type representation value, determining that the feature standard deviation and the standard deviation representation value corresponding to the matrix element meet the preset enhancement condition.

In practical use, when performing feature enhancement on the feature reconstruction value, at least one filter can be used, and the enhancement of each filter is executed sequentially according to the filter's order (the execution order of the filters can be set in advance by the administrators of the coding device or the decoding device).

Different filters can be distinguished by setting different indices (idx). When determining the feature masks, different feature masks can be set for different filters for the same matrix element. For example, for a filter with index idx, its corresponding feature mask can be:

$$\text{mask}[idx, c, i, j] =$$

$$\begin{cases} \text{if } \sigma[c, i, j] > \text{Threshold}[idx] \text{ AND } GreaterFlag[idx] \text{ to True, true} \\ \text{if } \sigma[c, i, j] < \text{Threshold}[idx] \text{ AND } GreaterFlag[idx] \text{ to False, true} \\ \qquad\qquad \text{False Otherwise} \end{cases}$$

where mask[idx,c,i,j] is a feature mask set by the filter with index idx for a matrix element at matrix coordinates (c,i,j), Threshold[idx] is a preset defined threshold corresponding to the filter with index idx, GreaterFlag[idx] is a standard deviation representation value set by the filter with index idx for the matrix element at matrix coordinates (c,i,j), and a[c,i,j] is a feature standard deviation corresponding to the matrix element at matrix coordinates (c,i,j).

In specific implementations, if mask[idx,c,i,j] is true (1 and 0 can also be used to replace true and false, in which case mask[idx,c,i,j]=I), it indicates that the filter with index idx will perform feature enhancement on the matrix element at matrix coordinates (c,i,j). If there are multiple sets of filters, feature enhancement may be performed multiple times on the matrix element at the same matrix coordinates.

Step S203: obtaining the enhanced feature value by performing feature enhancement on the feature reconstruction value based on the feature mask.

It should be noted that, the obtaining the enhanced feature value by performing feature enhancement on the feature reconstruction value based on the feature mask may involve performing feature enhancement on feature reconstruction values corresponding to matrix elements that need to be enhanced in the current image feature according to the feature mask, thereby obtaining the enhanced feature value.

In this embodiment, a feature standard deviation and a standard deviation representation value corresponding to each matrix element in the current image feature are acquired; a feature mask corresponding to the each matrix element in the current image feature is determined according to the feature standard deviation, the standard deviation representation value and the preset defined threshold; and the enhanced feature value is obtained by performing feature enhancement on the feature reconstruction value based on the feature mask. Since the corresponding feature mask is set for each matrix element in advance according to the feature standard deviation and standard deviation representation value corresponding to each matrix element and the preset defined threshold, the part of the matrix elements that need to be enhanced in the feature matrix corresponding to the current image feature is marked by setting the feature mask, so that when performing feature enhancement, the part of the matrix elements that need to be enhanced can be quickly determined, thereby speeding up the processing efficiency.

Referring to FIG. 7, FIG. 7 is a flowchart of a third embodiment of an image decoding method of the present disclosure.

Based on the second embodiment mentioned above, Step S203 of the image decoding method in this embodiment includes the following steps.

Step S2031: taking a matrix element with a corresponding feature mask of a first-type value as a target matrix element.

It should be noted that if a feature mask corresponding to a matrix element is the first-ty pe value, it indicates that the feature reconstruction value corresponding to the matrix element needs to be enhanced. Therefore, matrix elements in the three-dimensional matrix corresponding to the current image feature can first be filtered based on the feature masks, and the matrix element with the corresponding feature mask as the first-type value can be used as the target matrix element.

Step S2032: obtaining the enhanced feature value by performing enhancement on a feature reconstruction value corresponding to the target matrix element.

It should be noted that different ways can be employed to enhance the feature reconstruction value corresponding to the target matrix element to obtain the enhanced feature value.

In a possible implementation of the present disclosure, when enhancing the feature reconstruction value corresponding to the target matrix element, the enhancement can be combined with a preset scaling factor, the feature reconstruction value, a residual reconstruction value and a predicted feature value corresponding to the target matrix element. In this case, Step S2032 in this embodiment may include:

acquiring the feature reconstruction value, a residual reconstruction value and a predicted feature value corresponding to the target matrix element;

determining a first enhancement value according to a first scaling factor and the residual reconstruction value, and determining a second enhancement value according to a second scaling factor and the predicted feature value; and determining the enhanced feature value according to the feature reconstruction value, the first enhancement value and the second enhancement value.

It should be noted that the first scaling factor and the second scaling factor may be pre-set scaling factors, where different filters may correspond to different first scaling factors and second scaling factors.

In practical use, the enhanced feature value can be determined based on the feature reconstruction value, the first enhancement value, and the second enhancement value using a first feature enhancement formula.

The first feature enhancement formula is:

$$y\_hat\_en[c,i,j]=y\_hat[c,i,j]+mean\_hat[c,i,j]*Scale2[idx]+residual\_hat[c,i,j]*Scale1[idx]$$

where, (c,i,j) represents matrix coordinates of a target matrix element, idx is an index of a filter, y_hat_en[c, i,j] is an enhanced feature value corresponding to the target matrix element, yhat[c,i,j] is a feature reconstruction value corresponding to the target matrix element, residual_hat[c,i,j]*Scale1[idx] is a first enhancement value, mean_hat [c,i,j]*Scale2[idx] is a second enhancement value, mean_hat [c,i,j] is a predicted feature value corresponding to the target matrix element, residual_hat[c,i,j] is a residual reconstruction value corresponding to the target matrix element, Scale1[idx] is a first scaling factor, and Scale2[idx] is a second scaling factor.

In a possible implementation of the present disclosure, for the same filter, different scaling factors may also be set when channels corresponding to the target matrix element(s) are different. In this case, before the steps of determining a first enhancement value according to a first scaling factor and the residual reconstruction value, and determining a second enhancement value according to a second scaling factor and the predicted feature value, the following steps may further be included:

acquiring a feature channel corresponding to the target matrix element; and determining the first scaling factor and the second scaling factor according to the feature channel.

It should be noted that acquiring a feature channel corresponding to the target matrix element may involve obtaining matrix coordinates (c,i,j) of the target matrix element, extracting a value of c, and determining the feature channel corresponding to the target matrix element based on the value of c.

In practical use, determining the first scaling factor and the second scaling factor according to the feature channel may involve acquiring a factor-channel mapping table corresponding to a currently used filter, and looking up the corresponding first scaling factor and second scaling factor in the factor-channel mapping table based on the feature channel. The factor-channel mapping table contains the mapping relationship between feature channels and scaling factors, where different feature channels in the factor-channel mapping table may correspond to different first scaling factors and second scaling factors. The factor-channel mapping table may be set in advance by the administrators of the coding device or the decoding device.

At this time, the enhanced feature value can be determined based on the feature reconstruction value, the first enhancement value, and the second enhancement value according to a second feature enhancement formula, and the second feature enhancement formula can be:

$$y\_hat\_en[c,i,j]=y\_hat[c,i,j]+mean\_hat[c,i,j]*Scale2[c,idx]+residual\_hat[c,i,j]*Scale1[c,idx]$$

where, (c,i,j) represents matrix coordinates of a target matrix element, idx is an index of a filter, y_hat_en[c, i,j] is an enhanced feature value corresponding to the target matrix element, y_hat[c,i,j] is a feature reconstruction value corresponding to the target matrix element, residual_hat[c,i,j]*Scale1[c,idx] is a first enhancement value, mean_hat [c,i,j]*Scale2[c,idx] is a second enhancement value, mean_hat [c,i,j] is a predicted feature value corresponding to the target matrix element, residual_hat[c,i,j] is a residual reconstruction value corresponding to the target matrix element, Scale1[c,idx] is a first scaling factor corresponding to a feature channel of the target matrix element, and Scale2 [c,idx] is a second scaling factor corresponding to the feature channel of the target matrix element.

Additionally, the administrators of the coding device or the decoding device may also preset control switches for each channel, and turn off enhancement of features for a certain channel by turning off the corresponding control switches. Of course, the enhancement of the features of a certain channel can also be turned off by modifying a scaling factor corresponding to the channel in the factor-channel mapping table to 0.

In a possible implementation of the present disclosure, when enhancing the feature reconstruction value corresponding to the target matrix element, the enhancement can be combined with a preset scaling factor, the feature reconstruction value and a predicted feature value corresponding to the target matrix element. In this case, Step S2032 in this embodiment may include:

acquiring the feature reconstruction value and a predicted feature value corresponding to the target matrix element;

determining a first enhancement value according to a first scaling factor and the feature reconstruction value, and determining a second enhancement value according to a second scaling factor and the predicted feature value; and determining the enhanced feature value according to the first enhancement value and the second enhancement value.

It should be noted that the first scaling factor and the second scaling factor may be pre-set scaling factors, where different filters may correspond to different first scaling factors and second scaling factors. Similarly, for the same filter, different first scaling factors and second scaling factors can also be set based on the different feature channels of the target matrix element(s).

In practical use, the enhanced feature value can be determined based on the first enhancement value and the second enhancement value based on a third feature enhancement formula, and the third feature enhancement forurrla can be:

$$y\_hat\_en[c,i,j]=y\_hat[c,i,j]*\text{Scale1}[idx]+\text{mean\_hat}[c,i,j]*\text{Scale2}[idx]$$

where, (c,i,j) represents matrix coordinates of a target matrix element, idx is an index of a filter, y_hat_en[c, i,j] is an enhanced feature value, y_hat[c,i,j]*Scale1 [idx] is a first enhancement value, mean_hat [c,i,j] *Scale2[idx] is a second enhancement value, y_hat[c, i,j]is a feature reconstruction value corresponding to the target matrix element, mean_hat [c,i,j] is a predicted feature value corresponding to the target matrix element, Scale1[idx] is a first scaling factor, and Scale2 [idx] is a second scaling factor.

In a possible implementation of the present disclosure, when enhancing the feature reconstruction value corresponding to the target matrix element, the enhancement can be combined with a preset scaling factor, the feature reconstruction value and a residual reconstruction value corresponding to the target matrix element. In this case, Step S2032 in this embodiment may include:

acquiring the feature reconstruction value and a residual reconstruction value corresponding to the target matrix element;

determining a first enhancement value according to a first scaling factor and the feature reconstruction value, and determining a second enhancement value according to a second scaling factor and the residual reconstruction value; and determining the enhanced feature value according to the first enhancement value and the second enhancement value.

It should be noted that the first scaling factor and the second scaling factor may be pre-set scaling factors, where different filters may correspond to different first scaling factors and second scaling factors. Similarly, for the same filter, different first scaling factors and second scaling factors can also be set based on the different feature channels of the target matrix element(s).

In practical use, the enhanced feature value can be determined based on the first enhancement value and the second enhancement value based on a fourth feature enhancement formula, and the fourth feature enhancement formula can be:

$$y\_hat\_en[c,i,j]=y\_hat[c,i,j]*\text{Scale1}[idx]+\text{residual\_hat}[c,i,j]*\text{Scale2}[idx]$$

where, (c,i,j) represents matrix coordinates of a target matrix element, idx is an index of a filter, y_hat_en[c, i,j] is an enhanced feature value, y_hat[c,i,j]*Scale1 [idx] is a first enhancement value, residual_hat[c,i,j] *Scale2[idx] is a second enhancement value, y_hat[c, i,j] is a feature reconstruction value corresponding to the target matrix element, residual_hat[c,i,j] is a residual reconstruction value corresponding to the target matrix element, Scale1[idx] is a first scaling factor, and Scale2[idx] is a second scaling factor.

In a possible implementation of the present disclosure, when enhancing the feature reconstruction value corresponding to the target matrix element, the enhancement can be combined with a preset scaling factor, the feature reconstruction value and a feature standard deviation corresponding to the target matrix element. In this case, Step S2032 in this embodiment may include:

acquiring the feature reconstruction value and a feature standard deviation corresponding to the target matrix element;

determining a first enhancement value according to a first scaling factor and the feature reconstruction value, and determining a second enhancement value according to a second scaling factor and the feature standard deviation; and determining the enhanced feature value according to the first enhancement value and the second enhancement value.

It should be noted that the first scaling factor and the second scaling factor may be pre-set scaling factors, where different filters may correspond to different first scaling factors and second scaling factors. Similarly, for the same filter, different first scaling factors and second scaling factors can also be set based on the different feature channels of the target matrix element(s).

In practical use, the enhanced feature value can be determined based on the first enhancement value and the second enhancement value based on a fifth feature enhancement formula, and the fifth feature enhancement formula can be:

$$y\_hat\_en[c,i,j]=y\_hat[c,i,j]*\text{Scale1}[idx]+\sigma[c,i,j]*\text{Scale2}[idx]$$

where, (c,i,j) represents matrix coordinates of a target matrix element, idx is an index of a filter, y_hat_en[c, i,j] is an enhanced feature value, y_hat[c,i,j]*Scale1 [idx] is a first enhancement value, σ[c,i,j]*Scale2[idx] is a second enhancement value, y_hat[c,i,j] is a feature reconstruction value corresponding to the target matrix element, a[c,i,j] is a feature standard deviation corresponding to the target matrix element, Scale1[idx] is a first scaling factor, and Scale2[idx] is a second scaling factor.

In a possible implementation of the present disclosure, the feature reconstruction values include reconstruction values corresponding to different components, such as luminance reconstruction values and chrominance reconstruction values. Correspondingly, the enhanced feature values may also include enhancement values corresponding to different components, such as luminance enhanced feature values and chrominance enhanced feature values. When enhancing the feature reconstruction values corresponding to the target matrix elements, the feature enhancement processes for different components can be relatively independent and do not affect each other. In this case, Step S2032 in this embodiment may include the following steps:

obtaining the chrominance enhanced feature value by performing enhancement on a chrominance reconstruction value corresponding to the target matrix element; and obtaining the luminance enhanced feature value by performing enhancement on a luminance reconstruction value corresponding to the target matrix element.

It should be noted that during feature enhancement, different parameters, such as different scaling factors, can be set for the enhancement of different components in the same filter.

In a possible implementation of the present disclosure, feature reconstruction values of other components can also be utilized to perform secondary enhancement on an enhancement feature value of a certain component. For example, a luminance reconstruction value can be used to perform secondary enhancement on a chrominance enhanced feature value. In this case, after the step of obtaining the chrominance enhanced feature value by performing enhancement on a chrominance reconstruction value corresponding to the target matrix element, the following steps may further be included:

determining a first enhancement value according to the luminance reconstruction value and a first scaling factor; and performing secondary enhancement on the chrominance enhanced feature value according to the first enhancement value.

It should be noted that the first scaling factor may be a preset scaling factor, and different filters may correspond to different first scaling factors.

In practical use, a sixth feature enhancement formula can be used to perform secondary enhancement on the chrominance enhanced feature value according to the first enhancement value. The sixth feature enhancement formula can be:

$$y\_hat\_chroma\_en2[c,i,j]=y\_hat\_chroma\_en[c,i,j]+\\ Scale1[idx]y\_hat\_luma[c,i,j]$$

Where, y_hat_chroma_en2[c,i,j] is a secondarily enhanced chrominance enhanced feature value, y_hat_chroma_en[c,i,j] is a chrominance enhanced feature value, Scale1[idx]*y_hat_luma[c,i,j] is a first enhancement value, Scale1[idx] is a first scaling factor, and y_hat_luma[c,i,j] is a luminance reconstruction value corresponding to a target matrix element.

Of course, in specific implementations, a luminance enhanced feature value may also be secondarily enhanced using a chrominance reconstruction value corresponding to the target matrix element.

In a possible implementation of the present disclosure, in order to make the decoding device to clearly determine whether secondary enhancement is needed, the step of determining a first enhancement value according to the luminance reconstruction value and a first scaling factor may include the following steps:

extracting a component indication parameter from the image bitstream; and in a case that the component indication parameter is a chrominance enhancement type parameter, determining the first enhancement value according to the luminance reconstruction value and the first scaling factor.

It should be noted that the component indication parameter may be an indication parameter used to indicate whether secondary enhancement is needed, and a component enhancement feature value that needs to be performed secondary enhancement (i.e., enhanced twice). For example, the component indication parameter can take values from 0 to 3. If the component indication parameter is 0, it indicates that no secondary enhancement is needed; if the component indication parameter is 1, it indicates that the chrominance enhanced feature value need to be secondarily enhanced; if the component indication parameter is 2, it indicates that the luminance enhanced feature value need to be secondarily enhanced; if the component indication parameter is 3, it indicates that both the luminance enhanced feature value and chrominance enhanced feature value need to be secondarily enhanced.

It can be understood that if the component indication parameter is a chrominance enhancement type parameter, it indicates that secondary enhancement is needed, and the component that needs secondary enhancement is a chrominance enhanced feature value. In this case, the first enhancement value can be determined based on the luminance reconstruction value and the first scaling factor, and then the chrominance enhanced feature value can be secondarily enhanced based on the first enhancement value.

In a possible implementation of the present disclosure, the filter may further use the same scaling factor to perform feature enhancement on all matrix elements in the current image feature. In this case, the feature reconstruction value corresponding to the target matrix element may be enhanced according to a seventh feature enhancement formula. The seventh feature enhancement formula can be:

$$y\_hat\_en[c,i,j]=y\_hat[c,i,j]*Scale1[idx]$$

where, (c,i,j) represents matrix coordinates of a target matrix element, idx is an index of a filter, v_hat[c,i,j] is a feature reconstruction value corresponding to the target matrix element, y_hat_en[c,i,j] is an enhanced feature value, and Scale1[idx] is a scaling factor corresponding to the filter with index idx.

In a possible implementation of the present disclosure, different scaling factors may also be set to perform feature enhancement on matrix elements of different channels in the current image feature (of course, scaling factors of some of the same channels are also allowed to be the same). In this case, the feature reconstruction value corresponding to the target matrix element may be enhanced according to an eighth feature enhancement formula. The eighth feature enhancement formula can be:

$$y\_hat\_en[c,i,j]=y\_hat[c,i,j]*Scale1[c]$$

where, (c,i,j) represents matrix coordinates of a target matrix element, idx is an index of a filter, y_hat[c,i,j] is a feature reconstruction value corresponding to the target matrix element, y_hat_en[c,i,j] is an enhanced feature value, and Scale1[c] is a scaling factor corresponding to channel c.

In this embodiment, a matrix element with a corresponding feature mask of a first-type value is taken as a target matrix element, and the enhanced feature value is obtained by performing enhancement on a feature reconstruction value corresponding to the target matrix element. Since some matrix elements that need feature enhancement are first marked as target matrix elements based on the feature mask, and then the feature reconstruction values of the target matrix elements are enhanced, the number of matrix elements that need to be processed during the process is reduced, thereby improving the execution efficiency of the unage decoding method.

Referring to FIG. 8, FIG. 8 is a flowchart of a fourth embodiment of an image decoding method of the present disclosure.

Based on the first embodiment mentioned above, Step S20 of the image decoding method in this embodiment includes the following steps.

Step S201': extracting a syntax application range parameter from the image bitstream and obtaining feature position information corresponding to the current image feature.

It should be noted that if the same enhancement mode is used for feature enhancement of all image features within an entire image block (i.e., syntax parameters used during the enhancement process are identical), the parameters utilized in the enhancement (such as the first scaling factor and the second scaling factor) may only be optimal for some image features within the block, but not optimal for other subsequent image features, potentially even causing adverse effects. To avoid this, the coding device may set multiple sets of syntax parameters during coding, using different syntax parameters to enhance image features at different positions within the image block.

In practical applications, the syntax application scope parameters can be used to indicate an application scope corresponding to each set of syntax parameters. The feature position information corresponding to the current image feature may include its position within the image block, such as its row and column numbers.

Step S202': determining an enhancement syntax parameter according to the feature position information and the syntax application range parameter.

It should be noted that determining an enhancement syntax parameter according to the feature position information and the syntax application range parameter may involves identifying an application scope of each syntax parameter according to the syntax application range parameter, comparing the feature position information with the application scope of each syntax parameter, determining the application scope in which the feature position information falls, and then selecting a syntax parameter corresponding to the application scope as the enhancement syntax parameter.

In practical use, two sets of syntax parameters, namely a first syntax parameter and a second syntax parameter, can be set. A syntax application range parameter is set to distinguish which parts of image features the first syntax parameter and the second syntax parameter are respectively used for feature enhancement. The syntax application range parameter can limit the application scope of the syntax parameter in dimensions such as channel range, row, column, diagonal lines, etc.

For example, assuming that there are two sets of syntax parameters, the first syntax parameter and the second syntax parameter, and at this time the syntax application range parameter extracted from the bitstream is applylineNum=K, then for the image features with feature position information in columns 1 to K (which may also be rows or diagonal lines), the first syntax parameter is used to perform the feature enhancement, and the second syntax parameter is used for feature enhancement of image features from column K to the last column.

Of course, in practical applications, more than two sets of syntax parameters can be set. In this case, a syntax application range parameter can be set for each set of syntax parameters, and then the application scope of each set of syntax parameters can be determined based on the syntax application range parameter.

For example: Assuming that there are N sets of syntax parameters in total, there are also N syntax application range parameters, which can be expressed as applyLineNum(i) (i=I~N), where applyLineNum(i) is a syntax application range parameter corresponding to the i-th set of syntax parameters. At this time, it can be determined that the application range of the first set of syntax parameters is 1 to applyLineNum(1) columns (or rows or diagonal lines) of image features, the application range of the second set of syntax parameters is applyLineNum(1)+1 to applyLineNum (1)+applyLineNum(2) columns (or rows or diagonal lines) of image features, the application range of the third set of syntax parameters is applyLineNum(2)+1 to applyLineNum (2)+appliLineNum(3) columns (or rows or diagonal lines) of image features, and so on.

The image features of the row or column are relatively easy to understand, but the diagonal lines are relatively complex. For ease of understanding, it is now explained in conjunction with FIG. 9, but this solution is not limited thereto. FIG. 9 is a schematic diagram of a feature reconstruction sequence of the present disclosure. As shown in FIG. 9, the reconstruction sequence used for feature reconstruction is from the top-left to the bottom-right, reconstructing along diagonal lines. In FIG. 9. "Row" indicates the row in which the image feature is located, "Column" indicates the column in which the image feature is located, a dotted circle is a reconstructed feature (Samples that are already processed), a black circle is an image feature currently being reconstructed (Current sample), and T is a feature offset (Wave) for each reconstruction, FIG. 9 indicates that image features in the 8th diagonal line are currently being reconstructed. Based on the feature position information (i.e., row and column numbers) of the current image feature, it can be determined which diagonal line it falls on, and then which set of syntax parameters to use for feature enhancement can be determined accordingly.

Step S203': obtaining the enhanced feature value by performing feature enhancement on the feature reconstruction value according to the enhancement syntax parameter.

It can be understood that obtaining the enhanced feature value by performing feature enhancement on the feature reconstruction value according to the enhancement syntax parameter involves using the enhancement syntax parameter to perform feature enhancement in a feature enhancement mode provided in any of the embodiments of the above-described image decoding method, which will not be repeated herein.

In this embodiment, a syntax application range parameter is extracted from the image bitstream and feature position information corresponding to the current image feature is obtained: an enhancement syntax parameter is determined according to the feature position information and the syntax application range parameter; and the enhanced feature value is obtained by performing feature enhancement on the feature reconstruction value according to the enhancement syntax parameter. Since the specific enhancement syntax parameters used are determined based on the feature position information of the current image feature and the syntax application range parameters extracted from the image bitstream during feature enhancement, different syntax parameters can be applied to image features at different positions, thereby ensuring the effectiveness of feature enhancement as much as possible.

Referring to FIG. 10, FIG. 10 is a flowchart of a first embodiment of an image coding method of the present disclosure.

In this embodiment, the coding method includes the following steps.

Step S910: performing feature extraction on a to-be-coded image block, and taking an extracted feature as a current image feature.

It should be noted that the execution subject of this embodiment may be a coding device. The device may be an electronic device such as a personal computer, a server, or any other device capable of achieving the same or similar functions, and this embodiment is not limited to this. In this embodiment and the following embodiments, the image coding method of the present disclosure will be explained by taking the coding device as an example.

It should be noted that the to-be-coded image block can be obtained by dividing the image data that needs to be coded. The image data can be divided into either a single image block or multiple image blocks.

In practical applications, performing feature extraction on a to-be-coded image block, and taking an extracted feature as a current image feature may involve utilizing an analysis transform network to extract a feature from the to-be-coded image block, and then taking the currently extracted image feature as the current image feature.

Step S920: obtaining a predicted feature value by performing prediction according to a feature reconstruction value corresponding to a reconstructed feature.

In practical use, obtaining a predicted feature value by performing prediction according to a feature reconstruction value corresponding to a reconstructed feature may involve using a mean prediction network to perform feature prediction according to the feature reconstruction value corresponding to the reconstructed feature, thereby obtaining the predicted feature value. During the prediction process using the mean prediction network, auxiliary information can also be calculated through a hyperparameter coding network and input into the mean prediction network, so that the mean prediction network combines the feature reconstruction value corresponding to the reconstructed feature and the auxiliary information for prediction.

Step S930: determining a coding residual coefficient corresponding to the current image feature according to the predicted feature value.

In practical use, the predicted feature value can be subtracted from the feature value of the current image feature to obtain an original residual value, and then residual processing and quantization processing are performed on the original residual value to obtain the coding residual coefficient.

Step S940: writing the coding residual coefficient into an image bitstream corresponding to the to-be-coded image block.

It should be noted that by writing the coding residual coefficient into the image bitstream corresponding to the to-be-coded image block, when image decoding is required, the coding residual coefficient can be directly read from the image bitstream. Subsequently, inverse quantization processing and residual restoration processing are performed on the coding residual coefficient to obtain a residual reconstruction value. Finally, by combining the predicted feature value from the mean prediction network with the residual reconstruction value, the feature reconstruction value corresponding to the to-be-coded image block can be determined, facilitating image reconstruction.

In practical use, the coding device may also perform operations such as parameter calculation, parameter setting, syntax setting, and flag bit setting. The specific implementations can be derived by referring to the contents of any of the aforementioned embodiments of the image decoding method.

In this embodiment, feature extraction is performed on a to-be-coded image block, and an extracted feature is taken as a current image feature; a predicted feature value is obtained by performing prediction according to a feature reconstruction value corresponding to a reconstructed feature; a coding residual coefficient corresponding to the current image feature is determined according to the predicted feature value; and the coding residual coefficient is written into an image bitstream corresponding to the to-be-coded image block. Since the coding residual coefficient of the current image features is calculated and written into the image bitstream during coding, the coding efficiency for the image data is improved.

Referring to FIG. 11, FIG. 11 is a flowchart of a second embodiment of an image coding method of the present disclosure.

Based on the first embodiment of the above image coding method, after step S940, this embodiment may further include the following steps.

Step S950: obtaining a reconstructed image block by performing image decoding on the image bitstream corresponding to the to-be-coded image block.

It should be noted that after completing the coding of image data, the coding device also needs to verify the coding efficiency to ensure that the coding efficiency is high. At this time, the coding device can perform image decoding on the image bitstream corresponding to the to-be-coded image block to obtain a reconstructed image block.

Step S960: determining an image coding efficiency according to the reconstructed image block and the to-be-coded image block.

In practical use, determining an image coding efficiency according to the reconstructed image block and the to-be-coded image block may involve comparing the reconstructed image block and the to-be-coded image block, calculating a corresponding bit rate and PSNR based on the comparison result, and thereby determining the image coding efficiency.

In a possible implementation of the present disclosure, a preset efficiency threshold may be set in advance. After the image coding efficiency is obtained, the image coding efficiency is compared with the preset efficiency threshold. If the image coding efficiency is less than the preset efficiency threshold, it indicates that the current image coding efficiency is relatively low at this time. In this case, adjustments can be made to the parameters of the networks or models used during the coding process in an attempt to improve the image coding efficiency.

In practical use, when performing image decoding on the image bitstream corresponding to the to-be-coded image block, the image decoding method provided by any embodiment of the above image decoding method can be used, and this embodiment is not limited to this. The coding device may also perform operations such as parameter calculation, parameter setting, syntax setting, and flag bit setting. The specific implementations can be derived by referring to the contents of any of the aforementioned embodiments of the image coding method.

In this embodiment, a reconstructed image block is obtained by performing image decoding on the image bitstream corresponding to the to-be-coded image block; and an image coding efficiency is determined according to the reconstructed image block and the to-be-coded image block. Since image decoding is performed on the image bitstream obtained after coding is completed, and the reconstructed image block obtained from image decoding is compared with the to-be-coded image block to determine the image coding efficiency, so that the parameters in various networks used in the coding process can be adjusted according to the image coding, efficiency, and the image coding efficiency is improved.

In addition, an embodiment of the present disclosure further proposes a storage medium, on which an image decoding program and/or an image coding program is stored. When the image decoding program is executed, the image decoding method described above is implemented, and when the image coding program is executed, the image coding method described above is implemented.

Figure 12:
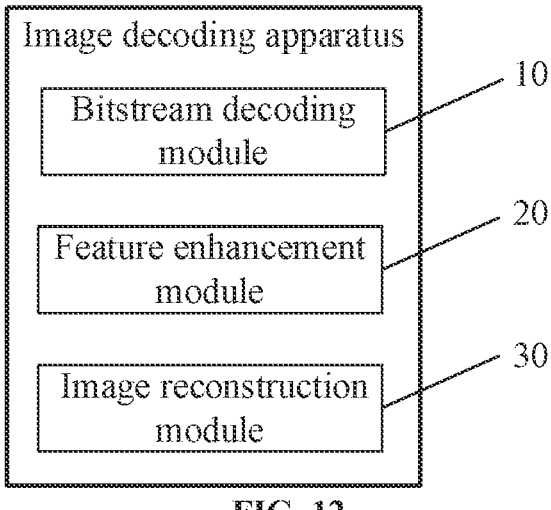
FIG. 12 is a structural block diagram of a first embodiment of an image decoding apparatus of the present disclosure.

Referring to FIG. 12, FIG. 12 is a structural block diagram of a first embodiment of an image decoding apparatus of the present disclosure.

As shown in FIG. 12, the image decoding apparatus proposed by an embodiment of the present disclosure includes:

a bitstream decoding module 10, configured to decode an image bitstream and determining a feature reconstruction value corresponding to a current image feature obtained by decoding;

a feature enhancement module 20, configured to obtain an enhanced feature value by performing feature enhancement on the feature reconstruction value; and an image reconstruction module 30, configured to obtain a reconstructed image block by performing synthesis transformation on the enhanced feature value.

In this embodiment, an image bitstream is decoded and a feature reconstruction value corresponding to a current image feature obtained by decoding is determined; an enhanced feature value is obtained by performing feature enhancement on the feature reconstruction value; and a reconstructed image block is obtained by performing synthesis transformation on the enhanced feature value. Since feature enhancement is performed on the feature reconstruction value before image reconstruction, and the image reconstruction is then carried out based on the enhanced feature value, the distortion introduced during processes such as quantization of the image feature is reduced, thereby improving the image quality of the reconstructed image.

In a possible implementation of the present disclosure, the current image feature is a three-dimensional feature matrix;

the feature enhancement module 20 is further configured to for each matrix element in the current image feature, acquire a feature standard deviation and a standard deviation representation value corresponding to the matrix element in the current image feature; determine a feature mask corresponding to the matrix element in the current image feature according to the feature standard deviation, the standard deviation representation value and a preset defined threshold; and obtain the enhanced feature value by performing feature enhancement on the feature reconstruction value based on the feature mask.

In a possible implementation of the present disclosure, the feature enhancement module 20 is further configured to in a case that the feature standard deviation and the standard deviation representation value corresponding to the matrix element meet a preset enhancement condition, set the feature mask corresponding to the matrix element as a first-type value; and in a case that the feature standard deviation and the standard deviation representation value corresponding to the matrix element do not meet the preset enhancement condition, set the feature mask corresponding to the matrix element as a second-type value.

In a possible implementation of the present disclosure, the feature enhancement module 20 is further configured to in a case that the feature standard deviation corresponding to the matrix element is greater than a preset defined threshold and the standard deviation representation value is a first-type representation value, determine that the feature standard deviation and the standard deviation representation value corresponding to the matrix element meet the preset enhancement condition; or, in a case that the feature standard deviation corresponding to the matrix element is less than a preset defined threshold and the standard deviation representation value is a second-type representation value, determine that the feature standard deviation and the standard deviation representation value corresponding to the matrix element meet the preset enhancement condition.

In a possible implementation of the present disclosure, the feature enhancement module 20 is further configured to take a matrix element with a corresponding feature mask of a first-type value as a target matrix element; and obtain the enhanced feature value by performing enhancement on a feature reconstruction value corresponding to the target matrix element.

In a possible implementation of the present disclosure, the feature enhancement module 20 is further configured to acquire the feature reconstruction value, a residual reconstruction value and a predicted feature value corresponding to the target matrix element; determine a first enhancement value according to a first scaling factor and the residual reconstruction value, and determine a second enhancement value according to a second scaling factor and the predicted feature value; and determine the enhanced feature value according to the feature reconstruction value, the first enhancement value and the second enhancement value.

In a possible implementation of the present disclosure, the feature enhancement module 20 is further configured to acquire a feature channel corresponding to the target matrix element; and determine the first scaling factor and the second scaling factor according to the feature channel, where different feature channels correspond to different first scaling factors and second scaling factors.

In a possible implementation of the present disclosure, the feature enhancement module 20 is further configured to acquire the feature reconstruction value and a predicted feature value corresponding to the target matrix element; determine a first enhancement value according to a first scaling factor and the feature reconstruction value, and determine a second enhancement value according to a second scaling factor and the predicted feature value; and determine the enhanced feature value according to the first enhancement value and the second enhancement value.

In a possible implementation of the present disclosure, the feature enhancement module 20 is further configured to acquire the feature reconstruction value and a residual reconstruction value corresponding to the target matrix element: determine a first enhancement value according to a first scaling factor and the feature reconstruction value, and determine a second enhancement value according to a second scaling factor and the residual reconstruction value; and determine the enhanced feature value according to the first enhancement value and the second enhancement value.

In a possible implementation of the present disclosure, the feature enhancement module 20 is further configured to acquire the feature reconstruction value and a feature standard deviation corresponding to the target matrix element; determine a first enhancement value according to a first scaling factor and the feature reconstruction value, and determine a second enhancement value according to a second scaling factor and the feature standard deviation; and determine the enhanced feature value according to the first enhancement value and the second enhancement value.

In a possible implementation of the present disclosure, the feature reconstruction value includes a luminance reconstruction value and a chrominance reconstruction value, and the enhanced feature value includes a luminance enhanced feature value and a chrominance enhanced feature value;

the feature enhancement module 20 is further configured to obtain the chrominance enhanced feature value by performing enhancement on a chrominance reconstruction value corresponding to the target matrix element; and obtain the luminance enhanced feature value by performing enhancement on a luminance reconstruction value corresponding to the target matrix element.

In a possible implementation of the present disclosure, the feature enhancement module 20 is further configured to determine a first enhancement value according to the luminance reconstruction value and a first scaling factor; and perform secondary enhancement on the chrominance enhanced feature value according to the first enhancement value.

In a possible implementation of the present disclosure, the feature enhancement module 20 is further configured to extract a component indication parameter from the image bitstream; and in a case that the component indication parameter is a chrominance enhancement type parameter, determine the first enhancement value according to the luminance reconstruction value and the first scaling factor.

In a possible implementation of the present disclosure, the bitstream decoding module 10 is further configured to decode the image bitstream, and determine a residual reconstruction value corresponding to the current image feature obtained by decoding; obtain a predicted feature value by performing prediction according to a feature reconstruction value of a reconstructed feature; and determine the feature reconstruction value corresponding to the current image feature according to the residual reconstruction value and the predicted feature value.

In a possible implementation of the present disclosure, the bitstream decoding module 10 is further configured to obtain the predicted feature value by performing prediction according to an enhanced feature value of the reconstructed feature; and determine the feature reconstruction value corresponding to the current image feature according to the residual reconstruction value and the predicted feature value.

In a possible implementation of the present disclosure, a feature enhancement mode for an enhanced feature value of the reconstructed feature is same as or different from a feature enhancement mode for an enhanced feature value of the current image feature.

In a possible implementation of the present disclosure, whether the feature enhancement mode for the enhanced feature value of the reconstructed feature and the feature enhancement mode for the enhanced feature value of the current image feature are the same or different is determined by a syntax flag, and the syntax flag is read from the image bitstream.

In a possible implementation of the present disclosure, the feature enhancement module 20 is further configured to extract a syntax application range parameter from the image bitstream and obtaining feature position information corresponding to the current image feature; determine an enhancement syntax parameter according to the feature position information and the syntax application range parameter; and obtain the enhanced feature value by performing feature enhancement on the feature reconstruction value according to the enhancement syntax parameter.

Figure 13:
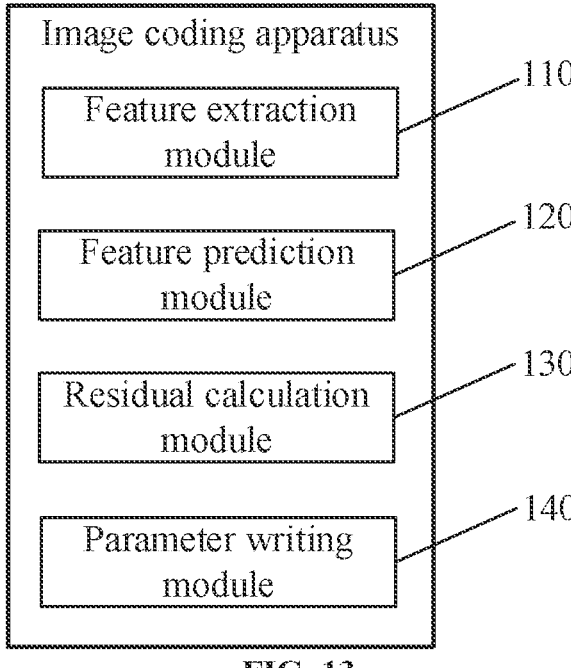
FIG. 13 is a structural block diagram of a first embodiment of an image coding apparatus of the present disclosure.

Referring to FIG. 13, FIG. 13 is a structural block diagram of a first embodiment of an image coding apparatus of the present disclosure.

As shown in FIG. 13, the image coding apparatus proposed by an embodiment of the present disclosure includes:
a feature extraction module 110, configured to perform feature extraction on a to-be-coded image block, and take an extracted feature as a current image feature;
a feature prediction module 120, configured to obtain a predicted feature value by performing prediction according to a feature reconstruction value corresponding to a reconstructed feature;
a residual calculation module 130, configured to determine a coding residual coefficient corresponding to the current image feature according to the predicted feature value; and
a parameter writing module 140, configured to write the coding residual coefficient into an image bitstream corresponding to the to-be-coded image block.

In this embodiment, feature extraction is performed on a to-be-coded image block, and an extracted feature is taken as a current image feature; a predicted feature value is obtained by performing prediction according to a feature reconstruction value corresponding to a reconstructed feature; a coding residual coefficient corresponding to the current image feature is determined according to the predicted feature value; and the coding residual coefficient is written into an image bitstream corresponding to the to-be-coded image block. Since the coding residual coefficient of the current image features is calculated and written into the image bitstream during coding, the coding efficiency for the image data is improved.

In a possible implementation of the present disclosure, the parameter writing module 140, is further configured to obtain a reconstructed image block by performing image decoding on the image bitstream corresponding to the to-be-coded image block; and determine an image coding efficiency according to the reconstructed image block and the to-be-coded image block.

It should be understood that the above is only an example and does not constitute any limitation on the technical solution of the present disclosure. In specific applications, those skilled in the art can make settings according to their needs, and the present disclosure imposes no restrictions in this regard.

It should be noted that the workflow described above is only schematic, and does not limit the scope of protection of the present disclosure. In practical application, those skilled in the art can choose some or all of them to achieve the purpose of the embodiments, and there is no limitation here.

In addition, for technical details that are not described in detail in this embodiment, reference can be made to the image coding or image decoding method provided in any embodiment of the present disclosure, and will not be repeated here.

In addition, it should be noted that, as used herein, the terms "including", "containing" or any other variations thereof are intended to cover non-exclusive inclusion, so that a process, method, article, or system including a series of elements not only includes those elements, but also includes other elements not explicitly listed or elements inherent to such process, method, article, or system. Without further limitations, an element defined by the phrase "including one" does not exclude the existence of other identical elements in the process, method, object or system including the element.

The serial numbers of the embodiments of the present disclosure mentioned above are solely for descriptive purposes and do not represent the superiority or inferiority of the embodiments.

Through the description of the above embodiments, those skilled in the art can clearly understand that the methods of the above embodiments can be realized by means of software and necessary general hardware platform, and of course it can also be realized by hardware, but in many cases the former is a better embodiment. Based on this understanding, the technical solution of the present disclosure can be embodied in the form of a software product, which is stored in a storage medium (such as a Read Only Memory (ROM)/RAM, magnetic disk and optical disk) and includes several instructions to make a terminal device (which can be a mobile phone, a computer, a server or a network device, etc.) execute the methods described in various embodiments of the present disclosure.

The above are merely optional embodiments of the present disclosure and do not limit the patent scope of the present disclosure. Any equivalent structural or equivalent process transformations made based on the contents of the specification and accompanying drawings of the present disclosure, or direct or indirect applications in other related technical fields, are similarly included in the patent protection scope of the present disclosure.

The invention claimed is:

1. An image decoding method, comprising:

decoding an image bitstream and determining a feature reconstruction value corresponding to a current image feature obtained by decoding, wherein the current image feature is a three-dimensional feature matrix;

obtaining an enhanced feature value by performing feature enhancement on the feature reconstruction value, comprising:

for each matrix element in the current image feature, acquiring a feature standard deviation and a standard deviation representation value corresponding to the matrix element in the current image feature;

determining a feature mask corresponding to the matrix element in the current image feature according to the feature standard deviation the standard deviation representation value and a preset defined threshold; and obtaining the enhanced feature value by performing feature enhancement on the feature reconstruction value based on the feature mask; and obtaining a reconstructed image block by performing synthesis transformation on the enhanced feature value.

2. The image decoding method according to claim 1, wherein the determining a feature mask corresponding to the matrix element in the current image feature according to the feature standard deviation, the standard deviation representation value and a preset defined threshold comprises:

in a case that the feature standard deviation and the standard deviation representation value corresponding to the matrix element meet a preset enhancement condition, setting the feature mask corresponding to the matrix element as a first-type value; and in a case that the feature standard deviation and the standard deviation representation value corresponding to the matrix element do not meet the preset enhancement condition, setting the feature mask corresponding to the matrix element as a second-type value.

3. The image decoding method according to claim 2, wherein, before the in a case that the feature standard deviation and the standard deviation representation value corresponding to the matrix element meet a preset enhancement condition, setting the feature mask corresponding to the matrix element as a first-type value, the method further comprises:

in a case that the feature standard deviation corresponding to the matrix element is greater than the preset defined threshold and the standard deviation representation value is a first-type representation value, determining that the feature standard deviation and the standard deviation representation value corresponding to the matrix element meet the preset enhancement condition; or, in a case that the feature standard deviation corresponding to the matrix element is less than the preset defined threshold and the standard deviation representation value is a second-type representation value, determining that the feature standard deviation and the standard deviation representation value corresponding to the matrix element meet the preset enhancement condition.

4. The image decoding method according to claim 2, wherein the obtaining the enhanced feature value by performing feature enhancement on the feature reconstruction value based on the feature mask comprises:

taking a matrix element with a corresponding feature mask of a first-type value as a target matrix element; and obtaining the enhanced feature value by performing enhancement on a feature reconstruction value corresponding to the target matrix element.

5. The image decoding method according to claim 4, wherein the obtaining the enhanced feature value by performing enhancement on a feature reconstruction value corresponding to the target matrix element comprises:

acquiring the feature reconstruction value, a residual reconstruction value and a predicted feature value corresponding to the target matrix element;

determining a first enhancement value according to a first scaling factor and the residual reconstruction value, and determining a second enhancement value according to a second scaling factor and the predicted feature value; and determining the enhanced feature value according to the feature reconstruction value, the first enhancement value and the second enhancement value.

6. The image decoding method according to claim 5, wherein, before the determining a first enhancement value according to a first scaling factor and the residual reconstruction value, and determining a second enhancement value according to a second scaling factor and the predicted feature value, the method further comprises:

acquiring a feature channel corresponding to the target matrix element; and determining the first scaling factor and the second scaling factor according to the feature channel, wherein different feature channels correspond to different first scaling factors and second scaling factors.

7. The image decoding method according to claim 4, wherein the obtaining the enhanced feature value by performing enhancement on a feature reconstruction value corresponding to the target matrix element comprises:

acquiring the feature reconstruction value and a predicted feature value corresponding to the target matrix element;

determining a first enhancement value according to a first scaling factor and the feature reconstruction value, and determining a second enhancement value according to a second scaling factor and the predicted feature value; and determining the enhanced feature value according to the first enhancement value and the second enhancement value.

8. The image decoding method according to claim 4, wherein the obtaining the enhanced feature value by performing enhancement on a feature reconstruction value corresponding to the target matrix element comprises:

acquiring the feature reconstruction value and a residual reconstruction value corresponding to the target matrix element;

determining a first enhancement value according to a first scaling factor and the feature reconstruction value, and determining a second enhancement value according to a second scaling factor and the residual reconstruction value; and determining the enhanced feature value according to the first enhancement value and the second enhancement value.

9. The image decoding method according to claim 4, wherein the obtaining the enhanced feature value by performing enhancement on a feature reconstruction value corresponding to the target matrix element comprises:

acquiring the feature reconstruction value and a feature standard deviation corresponding to the target matrix element;

determining a first enhancement value according to a first scaling factor and the feature reconstruction value, and determining a second enhancement value according to a second scaling factor and the feature standard deviation; and determining the enhanced feature value according to the first enhancement value and the second enhancement value.

10. The image decoding method according to claim 4, wherein the feature reconstruction value comprises a luminance reconstruction value and a chrominance reconstruction value, and the enhanced feature value comprises a luminance enhanced feature value and a chrominance enhanced feature value;

wherein the obtaining the enhanced feature value by performing enhancement on a feature reconstruction value corresponding to the target matrix element comprises;

obtaining the chrominance enhanced feature value by performing enhancement on a chrominance reconstruction value corresponding to the target matrix element; and obtaining the luminance enhanced feature value by performing enhancement on a luminance reconstruction value corresponding to the target matrix element.

11. The image decoding method according to claim 10, wherein after obtaining the chrominance enhanced feature value by performing enhancement on a chrominance reconstruction value corresponding to the target matrix element, the method further comprises:

determining a first enhancement value according to the luminance reconstruction value and a first scaling factor; and performing secondary enhancement on the chrominance enhanced feature value according to the first enhancement value.

12. The image decoding method according to claim 11, wherein the determining a first enhancement value according to the luminance reconstruction value and a first scaling factor further comprises:

extracting a component indication parameter from the image bitstream; and in a case that the component indication parameter is a chrominance enhancement type parameter, determining the first enhancement value according to the luminance reconstruction value and the first scaling factor.

13. The image decoding method according to claim 5, wherein the decoding an image bitstream and determining a feature reconstruction value corresponding to a current image feature obtained by decoding comprises:

decoding the image bitstream, and determining a residual reconstruction value corresponding to the current image feature obtained by decoding;

obtaining a predicted feature value by performing prediction according to a feature reconstruction value of a reconstructed feature; and determining the feature reconstruction value corresponding to the current image feature according to the residual reconstruction value and the predicted feature value.

14. The image decoding method according to claim 13, wherein after the decoding the image bitstream, and determining a residual reconstruction value corresponding to the current image feature obtained by decoding, the method further comprises:

obtaining the predicted feature value by performing prediction according to an enhanced feature value of the reconstructed feature; and determining the feature reconstruction value corresponding to the current image feature according to the residual reconstruction value and the predicted feature value.

15. The image decoding method according to claim 13, wherein a feature enhancement mode for an enhanced feature value of the reconstructed feature is same as or different from a feature enhancement mode for an enhanced feature value of the current image feature.

16. The image decoding method according to claim 15, wherein whether the feature enhancement mode for the enhanced feature value of the reconstructed feature and the feature enhancement mode for the enhanced feature value of the current image feature are the same or different is determined by a syntax flag, and the syntax flag is read from the image bitstream.

17. The image decoding method according to claim 13, wherein the obtaining an enhanced feature value by performing feature enhancement on the feature reconstruction value comprises:

extracting a syntax application range parameter from the image bitstream and obtaining feature position information corresponding to the current image feature;

determining an enhancement syntax parameter according to the feature position information and the syntax application range parameter; and obtaining the enhanced feature value by performing feature enhancement on the feature reconstruction value according to the enhancement syntax parameter.

18. A decoding device, wherein the decoding device comprises: a processor, a memory, and a decoding program stored on the memory and executable on the processor, the decoding program, when executed by the processor, cause the processor to:

decode an image bitstream and determine a feature reconstruction value corresponding to a current image feature obtained by decoding, wherein the current image feature is a three-dimensional feature matrix;

obtain an enhanced feature value by performing feature enhancement on the feature reconstruction value comprising:

for each matrix element in the current image feature, acquire a feature standard deviation and a standard deviation representation value corresponding to the matrix element in the current image feature;

determine a feature mask corresponding to the matrix element in the current image feature according to the feature standard deviation, the standard deviation representation value and a preset defined threshold; and obtain the enhanced feature value by performing feature enhancement on the feature reconstruction value based on the feature mask; and obtain a reconstructed image block by performing synthesis transformation on the enhanced feature value.

19. A coding device, wherein the coding device comprises: a processor, a memory, and a decoding program and/or an coding program stored on the memory and executable on the processor, the decoding program, when executed by the processor, implementing the image decoding method according to claim 1.

20. A non-transitory computer-readable storage medium, wherein the non-transitory-computer-readable storage medium stores an image decoding program and/or an image coding program, the image decoding program, when executed, implementing the image decoding method according to claim 1.

\* \* \* \* \*